United States Patent
Kanemoto et al.

(10) Patent No.: US 8,442,717 B2
(45) Date of Patent: May 14, 2013

(54) ABNORMALITY DETECTION APPARATUS FOR STARTER CONTROL SYSTEM

(75) Inventors: Kyohei Kanemoto, Toyota (JP); Kenji Yamamoto, Okazaki (JP); Ryouta Nakamura, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/450,553

(22) Filed: Apr. 19, 2012

(65) Prior Publication Data
US 2012/0271508 A1    Oct. 25, 2012

(30) Foreign Application Priority Data
Apr. 22, 2011 (JP) .................................. 2011-96292

(51) Int. Cl.
*G01M 17/00* (2006.01)

(52) U.S. Cl.
USPC ........ 701/33.6; 701/29.1; 701/31.4; 701/113; 701/102; 701/110; 701/112; 123/406.53; 123/491; 123/179.4; 123/179.28; 123/179.25

(58) Field of Classification Search ................. 701/29.1, 701/33.1, 31.4, 113, 102, 110, 112; 123/406, 123/491, 179
See application file for complete search history.

(56) References Cited

U.S. PATENT DOCUMENTS

| 6,745,120 | B2* | 6/2004 | Iwagami et al. | 701/114 |
| 7,203,580 | B2* | 4/2007 | Ban et al. | 701/29.1 |
| 7,970,527 | B2* | 6/2011 | Nishi et al. | 701/113 |
| 2004/0162653 | A1* | 8/2004 | Ban et al. | 701/35 |
| 2010/0050970 | A1 | 3/2010 | Okumoto et al. | |
| 2010/0090526 | A1 | 4/2010 | Itou | |
| 2011/0137544 | A1 | 6/2011 | Kawazu et al. | |

FOREIGN PATENT DOCUMENTS
JP    11-30139    2/1999
JP    2004-3434   1/2004

* cited by examiner

*Primary Examiner* — Redhwan K Mawari
(74) *Attorney, Agent, or Firm* — Nixon & Vanderhye PC

(57) ABSTRACT

In an ECU provided for idle-stop control, when a user start command is outputted from an ECU to start an engine in response to a manual start operation of a driver, transistors are turned on and a solenoid is operated to engage a pinion gear of a starter with a ring gear. After a delay period of a delay circuit, a transistor is turned on by an output of the delay circuit and an electromagnetic switch is turned on to energize a motor of the starter. A microcomputer measures an actual delay time from when the user start command is outputted to turn-on of the transistor and checks whether the measured time corresponds to a normal time of the delay time.

23 Claims, 9 Drawing Sheets

FIG. 7

| Abnormality Detection Timing | | Before User Start | User Start Time | In Normal Operation | In Idle-Stop | After User Stop (Main Relay: ON) |
|---|---|---|---|---|---|---|
| Fail-safe Processing | Short Delay Abnormality | · Warning to User<br>· User Start Prohibition | · Warning to User<br>· Idle-Stop Prohibition<br>· Engine Non-Stop Advice<br>· User Start Prohibition | · Warning to User<br>· Idle-Stop Prohibition<br>· Engine Non-Stop Advice<br>· User Start Prohibition | · Warning to User<br>· Engine Start<br>☐ Auto-Start Success<br>　· Idle-Stop Prohibition<br>　· Engine Non-Stop Advice<br>　· User Start Prohibition<br>☐ Auto-Start Failure<br>　· Hazard Light ON/OFF | · Warning to User<br>· User Start Prohibition |
| | Long-Delay Abnormality | · Warning to User | · Warning to User | · Warning to User | · Warning to User | · Warning to User |

# ABNORMALITY DETECTION APPARATUS FOR STARTER CONTROL SYSTEM

CROSS REFERENCE TO RELATED APPLICATION

This application is based on and incorporates herein by reference Japanese patent application No. 2011-96292 filed on Apr. 22, 2011.

TECHNICAL FIELD

The present disclosure relates to a control system for a starter, which cranks an engine for starting, and particularly to an abnormality detection apparatus for the starter control system.

BACKGROUND

Recently an engine automatic stop and start system (generally referred to as an idle-stop or idling-stop system) is provided in a vehicle as disclosed in for example, patent document 1 (JP 11-30139A). This system automatically stops an engine when a predetermined automatic stop condition is satisfied, and then automatically starts, that is, restarts, the engine when a predetermined automatic start condition is satisfied.

This starter is configured to engage a pinion gear driven to rotate by a motor to a ring gear of the engine and to energize the motor (drive the motor) by supplying electric current independently of each other.

Since this starter is capable of controlling the pinion gear and the motor independently, the starter is referred to as an independently-controlled starter. In such a vehicle having the idle-stop system (idle-stop vehicle), the independently-controlled starter is used more and more.

More specifically, when the pinion gear is driven to rotate by the starter motor while being engaged with the ring gear of the engine, it rotates the ring gear to crank the engine. In the independently-controlled starter, a pinion control solenoid and a motor control electromagnetic switch are controllable independently. The pinion control solenoid is an actuator that moves the pinion gear from an initial position, at which the pinion gear is disengaged from (not engaged with) the ring gear, to an engagement position, at which the pinion gear is engaged with the ring gear. The motor control electromagnetic switch is a large-sized relay, which conducts a power supply path leading to the motor.

Thus, according to the independently-controlled starter, the pinion gear is engaged with the ring gear by driving the pinion control solenoid, specifically by energizing a coil of the solenoid, before the motor is operated. Then the motor is started to operate with its pinion gear engaged with the ring gear by driving the motor control electromagnetic switch, specifically by energizing a coil of the electromagnetic switch. As a result, wear of the pinion and the ring gear and noise as well as vibration at the time of engagement of the same are reduced.

In the idle-stop vehicle, the engine is stopped and restarted while traveling, including at rest with travel speed being 0. It is therefore preferred to use the independently-controlled starter to reduce the wear, noise and vibration. In addition, even after the engine is controlled to automatically stop, the engine sometimes need be restarted while the engine is still continuing to rotate by inertia with falling rotation. For smoothly restarting the engine, the difference in rotation speeds of the pinion gear and the ring gear should be reduced when the pinion gear engages the ring gear. It is therefore desired that the pinion gear is pushed out for engagement after the motor is driven when the engine rotation speed is high. It is desired that the motor is driven after the pinion gear is pushed out, when the engine rotation speed is low.

In the vehicle including the independently-controlled starter, a control device for the starter drives first the pinion control solenoid and then operates the motor by driving the motor control electromagnetic switch, even in a user start case, in which the engine is started by a manual operation of the user. This user start case is not an automatic engine restart case from the idle-stop condition but an engine start case by a manual start operation of the driver. The idle-stop condition indicates that the engine is being maintained at reset automatically by the idle-stop system.

As proposed in, for example, patent document 2 (JP 2010-90874A, US 2010/0090526 A1), a user start circuit for performing a user start operation may wholly or partly be formed as a circuit, which is separate from an automatic restart circuit for restarting an engine from an idle-stop condition. This circuit arrangement is for improving reliability by redundancy and ensuring a user start operation with low power voltage. More specifically, this user start circuit is so configured that, when a driver turns on a key switch as a starting manual operation with a neutral switch of a transmission being turned on, a solenoid relay for energizing a coil of a pinion control solenoid is turned on with a battery voltage, which is supplied as a user start command signal generated by such a manual operation of the user. Further, a motor relay is turned on after a predetermined delay time of a delay circuit from the turn-on of the solenoid relay.

According to the above-exemplified user start circuit, a pinion gear contacts a ring gear for engagement at higher rotation speeds when the delay time of the delay circuit becomes shorter than a predetermined normal delay time in comparison to a case that the delay time is equal to the normal delay time. The pinion gear and the ring gear wear due to poor engagement between the pinion gear and the ring gear. As the wear progresses, the pinion gear and the ring gear will not be able to engage properly and the engine will not be started. Particularly in the idle-stop vehicle, since the engine is controlled to automatically stop on a travel road, the engine will be disabled to be started again and the vehicle will be disabled to travel again.

It is also not desired that the delay time of the delay circuit becomes longer than the normal delay time. Since the timing of starting the motor operation is delayed more, the startability of the engine is degraded. When the pinion gear contacts the ring gear, it generates hitting sound at timing different from operation sound of a motor. This hitting sound causes a driver of a vehicle (user) to feel discomfort.

In an apparatus for controlling an independently-controlled starter, it is possible to operate a motor by driving a motor control electromagnetic switch after a predetermined delay time from driving first a pinion control solenoid at the time of restarting an engine from an idle-stop condition. If the delay time deviates from a predetermined normal delay time, the above-described adversary operation will arise similarly.

SUMMARY

It is therefore an object to detect abnormality in time difference control in a starter control system, which controls a starter of independently-controlled type. According to the time difference control, current supply to a motor of a starter is started after an elapse of a predetermined delay time from starting current supply to a pinion control actuator, which engages a pinion gear of the starter to a ring gear of an engine.

An abnormality detection apparatus is provided for a starter control system of a vehicle. The starter control system includes a pinion control actuator, a motor control switch part, a first drive part and a second drive part. The pinion control actuator, when energized, moves a pinion gear of a starter for starting an engine of a vehicle from an initial position at which the pinion gear is disengaged with a ring gear of the engine to an engagement position at which the pinion gear is engaged with the ring gear. The motor control switch part is provided in a current supply path to a motor of the starter which rotates the pinion gear, and operable to turn on independently of energization of the pinion control actuator and energize the motor by conducting the current supply path when turned on. The first drive part performs a first drive operation, which energizes the pinion control actuator to move the pinion gear from the initial position to the engagement position at a start time of starting the engine. The second drive part performs a second drive operation, which turns on the motor control switch part to energize the motor to start cranking of the engine after an elapse of a predetermined delay time from a start of the first operation of the first drive part.

The abnormality detection apparatus comprises a start time abnormality detection part, which checks whether an actual delay time is a normal value. The actual delay time is measured as an actual period from a start of the first drive operation by the first drive part to a start of the second drive operation by the second drive part at the time of starting the engine.

BRIEF DESCRIPTION OF THE DRAWINGS

In the accompanying drawings:

FIG. 7 is a table showing the fail-safe processing;

DETAILED DESCRIPTION (First Embodiment)

Figure 1:
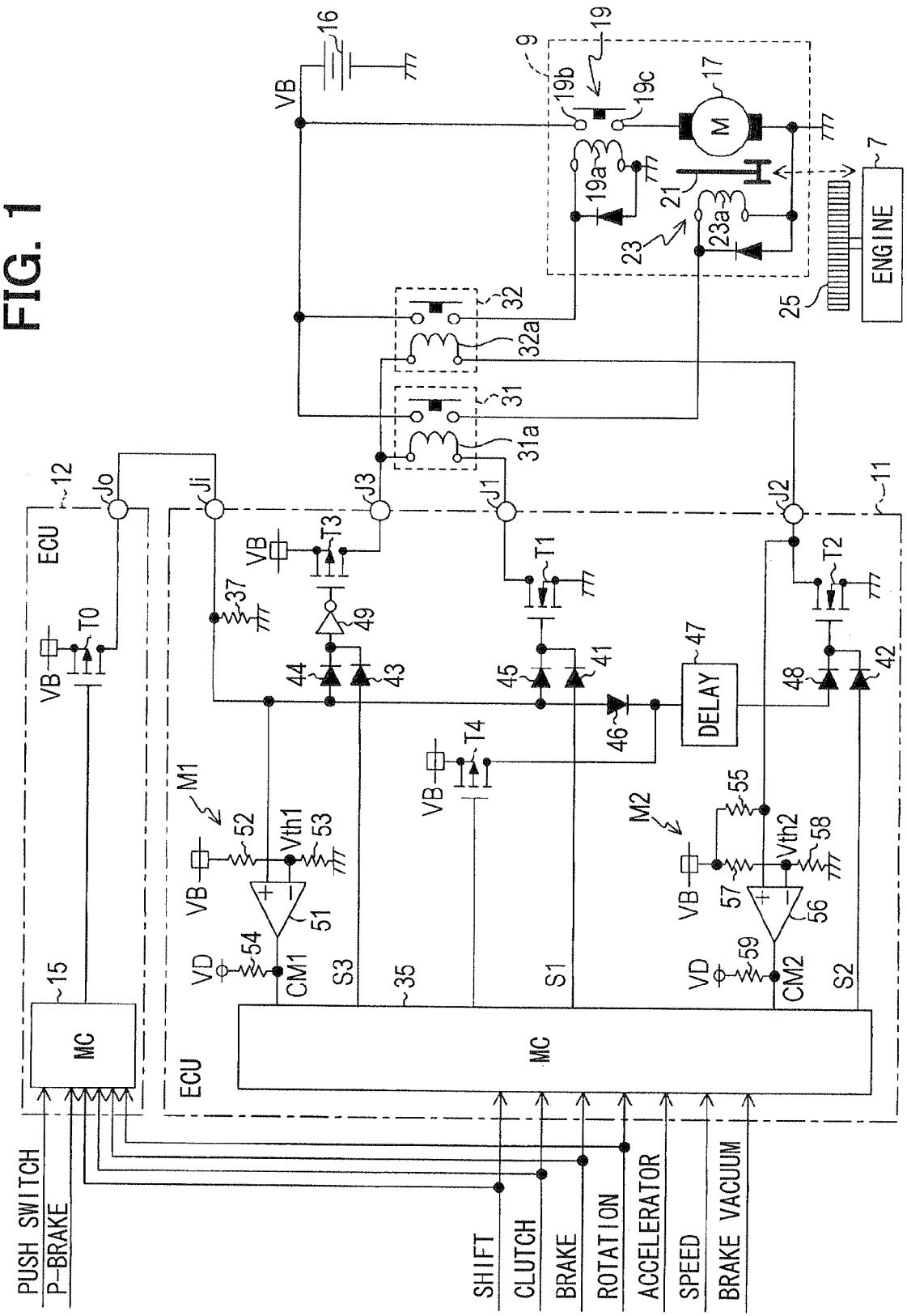
FIG. 1 is a circuit diagram showing a starter control system according to a first embodiment.

Referring to FIG. 1, a starter control system according to a first embodiment is provided to control a starter 9, which starts an engine 7 of a vehicle. The starter 9 is controlled as a part of idle-stop control (automatic stop and automatic start control) for the engine 7. The vehicle is assumed to have a manual transmission.

The starter control system has two electronic control units (ECUs) 11 and 12. The ECU 11 is for the idle-stop control for the engine 7. It drives the starter 9 to operate, that is, crank the engine 7, when the engine 7 is automatically restarted in the idle-stop control.

The ECU 12 drives the starter 9 to operate when the engine 7 is started in response to a manual start operation of a driver of a vehicle. At the user start time, the ECU 12 outputs a user start command signal to the ECU 11 so that a drive circuit in the ECU 11 operates in response to the user start command signal. The user start command signal is a start command for starting the engine 7. Starting the engine 7 by the manual start operation of the user is referred to as user start.

The ECU 12 therefore receives a push-switch signal generated by a push-switch (start-stop switch) for starting and stopping the engine 7 by a manual operation of a driver.

The ECU 12 also receives various signals to confirm that a user start permission condition is satisfied. The signals include, for example, a parking brake switch signal (P-brake signal) indicating that a parking brake of the vehicle is operated, a shift signal generated by a sensor for detecting a position of a shift lever (shift position) of a transmission, a clutch signal generated by a sensor for detecting that a clutch pedal is being operated (pressed down), and a brake signal generated by a sensor for detecting that a brake pedal is being operated (pressed down). The ECU 12 further receives a rotation signal generated by a crankshaft sensor for checking whether the engine 7 has attained complete combustion, which indicates that starting is completed and the engine 7 is successfully started.

The ECU 12 includes a microcomputer (MC) 15 and a transistor T0. One of two output terminals of the transistor T0 is connected to a power line of a battery voltage VB, that is, a voltage at a positive terminal of a vehicle-mounted battery 16. The other output terminal is connected to a terminal Jo provided in the ECU 12 to output a user start command signal. The transistor T0 is a P-channel MOSFET. The transistor T0 is turned on and off by a drive circuit (not shown) in response to a drive signal from the microcomputer 15.

The microcomputer 15 turns on the transistor T0 to output the battery voltage VB from the terminal Jo by determining, based on the signals inputted to the ECU 12, that a user start permission condition is satisfied and a driver has performed a start operation required for starting the engine 7, for example, manipulation of turning on the start-stop switch for more than a predetermined period. The battery voltage VB outputted from the terminal Jo is the user start command signal.

The user start permission condition includes that, for example, the parking brake is applied, the shift lever is at the neutral position, and both of the brake pedal and the clutch pedal are operated. Driver operation for those is also the start operation for the user start permission condition.

For performing the idle-stop control, the ECU 11 receives the signals, for example, the shift signal, the clutch signal, the brake signal and the rotation signal. The ECU 11 further receives an accelerator signal generated by a sensor for detecting that an accelerator pedal is operated (pressed down), a travel speed generated by a sensor for detecting a travel speed (vehicle speed) of the vehicle, a brake vacuum signal generated by a sensor for detecting a brake vacuum (vacuum in a brake booster device), and the like.

The ECU 11 has a terminal Ji connected to the terminal Jo of the ECU 12 through an in-vehicle wiring (that is, wire harness). The user start command signal is inputted from the ECU 12 to the terminal Ji.

The starter 9 is an independently-controlled type and includes a starter motor 17 provided as a drive power source for cranking the engine 7, a motor control electromagnetic switch 19, which supplies a current to the motor 17, a pinion gear 21, which is driven to rotate by the motor 17, and a pinion control solenoid 23, which moves the pinion gear 21.

The electromagnetic switch 19 is a large-sized relay provided in a current supply path from the battery 16 to the motor 17. The electromagnetic switch 19 is selectively driven to an on-state for conducting the current supply path to energize the motor 17 and to an off-state for interrupting the current supply path.

Specifically, the electromagnetic switch 19 has a coil 19a, one end of which is connected to a ground line, a pair of fixed contacts 19b and 19c and a movable contact. When the coil 19a is energized by the current by the application of the battery voltage VB to the other end of the coil 19a, the contacts 19b and 19c are short-circuited by the moveable contact to form the current path (this is the on-state). When the coil 19a is not energized, the contacts 19b and 19c are disconnected and interrupt the current supply path (this is the off-state).

The pinion control solenoid 23 is an actuator, which moves the pinion gear 21 from an initial position (shown in FIG. 1), at which pinion gear 21 is disengaged from (not engaged with) the ring gear 25, to a position (engagement position), at which the pinion gear 21 is engaged with the ring gear 25.

Specifically, the pinion control solenoid 23 includes a coil 23a, one end of which is connected to the ground line and a biasing member (not shown) such as a spring. When the coil 23a is not energized, the pinion control solenoid 23 positions the pinion gear 21 to the initial position (shown in FIG. 1) by the force of the biasing member. When the coil 23a is energized by the application of the battery voltage VB to the other end of the coil 23a, the pinion control solenoid 23 pushes the pinion gear 21 out of the starter 9 by its electromagnetic force generated by the energization as indicated by a dotted-line downward arrow in FIG. 1 for engagement with the ring gear 25. The energization of the coil 23a of the pinion control solenoid 23 corresponds to energization of the pinion control solenoid 23.

When the motor 17 is energized with the pinion gear 21 being engaged with the ring gear 25, the rotary force of the motor 17 is transferred to the ring gear 25 through the pinion gear 21 so that the engine 7 is cranked.

In the current path from the battery 16 to the coil 23a of the pinion control solenoid 23 in the vehicle, a pinion drive relay 31 is provided to conduct and interrupt the current path. In the current path from the battery 16 to the coil 19a of the electromagnetic switch 19, a motor drive relay 32 is provided to conduct and interrupt the current path.

Specifically, the pinion drive relay 31 is provided such that a pair of fixed contacts thereof is in the current path, which is from the battery 16 to the coil 23a. When the pair of contacts is short-circuited by a movable contact (this is the on-state) by the energization of the coil 31a of the relay 31, the coil 23a is energized so that the pinion control solenoid 23 is operated to engage the pinion gear 21 with the ring gear 25.

Similarly the motor drive relay 32 is provided such that a pair of fixed contacts thereof is in the current path, which is from the battery 16 to the coil 19a. When the pair of contacts is short-circuited by a movable contact (this is the on-state) by the energization of the coil 32a of the relay 32, the coil 19a is energized so that the electromagnetic switch 19 is turned on to energize the motor 17.

A low potential side end of the coil 31a of the relay 31 is connected to a terminal J1 of the ECU 11. A low potential side end of the coil 32a of the relay 32 is connected to a terminal J2 of the ECU 11. High potential side ends of the coils 31a, 32a of the relays 31, 32 are both connected to a terminal J3 of the ECU 11.

The ECU 11 has three transistors T1, T2 and T3. The transistor T1 has one output terminal connected to the terminal 31 of the ECU 11 and the other output terminal connected to the ground line. The transistor T2 has one output terminal connected to the terminal 32 of the ECU 11 and the other output terminal connected to the ground line. The transistor T3 has one output terminal connected to the terminal J3 of the ECU 11 and the other output terminal connected to the power line of the battery voltage VB.

When the transistor T1 turns on with the transistor T3 being turned on, the current flows to the coil 31a of the relay 31 and the relay 31 turns on. When the transistor T2 turns on with the transistor T3 being turned on, the current flows to the coil 32a of the relay 32 and the relay 32 turns on. The transistors T1 and T2 are N-channel MOSFETs and the transistor T3 is a P-channel MOSFET.

The ECU 11 also includes a microcomputer (MC) 35, which executes various processing for the idle-stop control. The signals inputted to the ECU 11 are inputted to the microcomputer 35 through input circuits (not shown) in signal forms suitable for the microcomputer 35. Although not shown in the figure, a voltage generated by dividing the battery voltage VB by resistors (not shown) is inputted to the microcomputer 35 so that the microcomputer 35 detects the battery voltage VB based on the divided voltage. The microcomputer 35 detects voltage values of analog input signals by A/D-conversion of its internal A/D converter.

The ECU 11 further includes a pull-down resistor 37, a diode 41, a diode 42, a diode 43, three diodes 44, 45, 46, a delay circuit 47, a diode 48 and a drive circuit 49. The pull-down resistor 37 is connected between the terminal Ji and the ground line. The diode 41 is provided to receive at its anode a high-active drive signal S1 outputted from the microcomputer 35 to turn on the transistor T1. The diode 42 is provided to receive at its anode a high-active drive signal S2 outputted from the microcomputer 35 to turn on the transistor T2. The diode 43 is provided to receive at its anode a high-active drive signal S3 outputted from the microcomputer 35 to turn on the transistor T3. The three diodes 44, 45 and 46 are provided to receive at respective anodes the user start command signal from the terminal Ji. The delay circuit 47 is provided to delay the user start command signal outputted from the cathode of the diode 46 by a predetermined delay time Td. The diode 48 is provided to receive at its anode the user start command signal (delayed user start command signal) outputted from the delay circuit 47. The drive circuit 49 is provided to turn on the transistor T3 by inverting its input signal.

In the ECU 11, the cathodes of the diodes 41 and 45 are connected to each other so that cathode voltages of the diodes 41 and 45 are supplied as a drive voltage to a gate of the transistor T1. The transistor T1 thus turns on when the drive signal S1 is outputted at a high level from the microcomputer 35 or the user start command signal is outputted from the ECU 12 to the ECU 11.

The cathodes of the diodes 42 and 48 are connected to each other so that cathode voltages of the diodes 42 and 48 are supplied as a drive voltage to a gate of the transistor T2. The transistor T2 thus turns on when the drive signal S2 is outputted at a high level from the microcomputer 35 or the user start command signal is outputted from the delay circuit 47.

The cathodes of the diodes 43 and 44 are connected to each other so that cathode voltages of the diodes 43 and 44 are supplied to the drive circuit 49 for the transistor T3. The drive circuit 49 supplies the battery voltage VB to the gate of the transistor T3 to turn off the transistor T3 when the cathode voltages of the diodes 43 and 44 are lower than a threshold voltage (for example, 2.5V), which is lower than an operating voltage (5V) of the microcomputer 35 and higher than 0V. The drive circuit 49 supplies a voltage lower than the battery voltage VB to the gate of the transistor T3 to turn on the transistor T3 when the cathode voltages of the diodes 43 and 44 are equal to or higher than the threshold voltage. The transistor T3 thus turns on when the drive signal S3 is outputted from the microcomputer 35 or the user start command signal is outputted from the ECU 12 to the ECU 11.

The ECU 11 further includes, as circuits for checking whether the delay circuit 47 is operating normally, a first monitor circuit M1, a second monitor circuit M2 and a dummy signal output transistor T4. The monitor circuit M1 is provided to monitor the voltage (corresponding to presence or absence of the user start command signal) at the terminal Ji. The monitor circuit M2 is provided to monitor the voltage (corresponding to on/off condition of the transistor T2) at the terminal 32. The transistor T4 is provided to apply a dummy user start command signal as a dummy signal to the delay circuit 47.

The monitor circuit M1 includes a comparator 51, two resistors 52, 53 and a pull-up resistor 54. A non-inverting input terminal (positive terminal) of the comparator 51 is connected to the terminal Ji. The resistors 52 and 53 divide the battery voltage VB and apply the divided voltage as a comparison reference voltage Vth1 to an inverting input terminal (negative terminal) of the comparator 51. The pull-up resistor 54 is connected to a power line of a fixed voltage VD (5V) generated inside the ECU 11 and an output terminal of the comparator 51.

The monitor circuit M2 includes a pull-up resistor 55, a comparator 56, two resistors 57, 58 and a pull-up resistor 59. The pull-up resistor 55 is connected to the power line of the battery voltage VB and the terminal J2. A non-inverting input terminal (positive terminal) of the comparator 56 is connected to the terminal 32. The resistors 57 and 58 divide the battery voltage VB and apply the divided voltage as a comparison reference voltage Vth2 to an inverting input terminal (negative terminal) of the comparator 56. The pull-up resistor 59 is connected between the power line of the fixed voltage VD and an output terminal of the comparator 56.

The ratio of resistance values of the resistors 52, 53 of the monitor circuit M1 and the ratio of resistance values of the resistors 57, 58 of the monitor circuit M2 are set to 1:1, for example, so that the comparison reference voltages Vth1, Vth2 applied to the inverting input terminals of the comparators 51, 56 becomes equal to one-half (VB/2) of the battery voltage VB.

With this arrangement, when the user start command signal is outputted from the ECU 12 and the voltage at the terminal Ji is changed from 0V to a voltage higher than VB/2, that is, to the battery voltage VB if the on-resistance of the transistor T0 is ignored, an output CM1 of the comparator 51, which is an output of the monitor circuit M1, changes from a low level to a high level. When the transistor 12 is turned from the off-state to the on-state and the voltage at the terminal J2 is changed from the battery voltage VB to a voltage lower than VB/2, that is to 0V if the on-resistance of the transistor T2 is ignored, an output CM2 of the comparator 56, which is an output of the monitor circuit M2, changes from the high level to the low level. The outputs CM1, CM2 of the comparators 51, 56 are inputted to the microcomputer 35. Output circuits inside the comparators 51, 56 are in a current-draw type (open-collector or open-drain) and hence the pull-up resistors 54, 59 are provided so that the comparators 51, 56 output high level signals (5V).

One of two output terminals of the transistor T4 in the ECU 11 is connected to the power line of the battery voltage VB of the ECU 11. The other of the output terminals is connected to the cathode of the diode 46, which is an input line of the user start command signal in the delay circuit 47. The transistor T4 is a P-channel MOSFET.

With this arrangement, when the transistor T4 turns on, the battery voltage VB is outputted as the dummy signal from the transistor 14 to the delay circuit 47. The dummy signal however is not supplied to the anodes of the diodes 44 and 45 because of the diode 46. The transistor T4 is turned on and off through a drive circuit (not shown) by a drive signal from the microcomputer 35.

In the vehicle, a power supply condition is switched over between an ignition-on state and an ignition-off state in accordance with the operation of the start-stop switch. In the ignition-on state, the battery voltage VB is supplied to an ignition system power line. In the ignition-off state, the battery voltage VB is not supplied to the ignition system power line. The ECU 12 operates with the battery voltage VB, that is, ignition system battery voltage VB, supplied from the ignition system power line. The ECU 12 operates when the vehicle is in the ignition-on state.

In the vehicle, a main relay for power supply (not shown) is turned on and its output line is connected to the positive terminal of the battery 16. The main relay continues to be in the on-state even after the vehicle is set to the ignition-off state. The main relay is turned off by a power supply control ECU (not shown), when the power supply control ECU detects that all processing in the ECU 11 and specified ECUs is finished. The ECU 11 operates with the battery voltage VB (main relay system battery voltage VB) supplied from an output power line of the main relay. The ECU 11 is configured to start its operation when the start-stop switch is operated by the driver to provide the ignition-on state. The ECU 11 is further configured to continue to operate until required processing is finished even after the power supply condition is changed to the ignition-off state, that is, even after the engine 7 is stopped.

Figure 2:
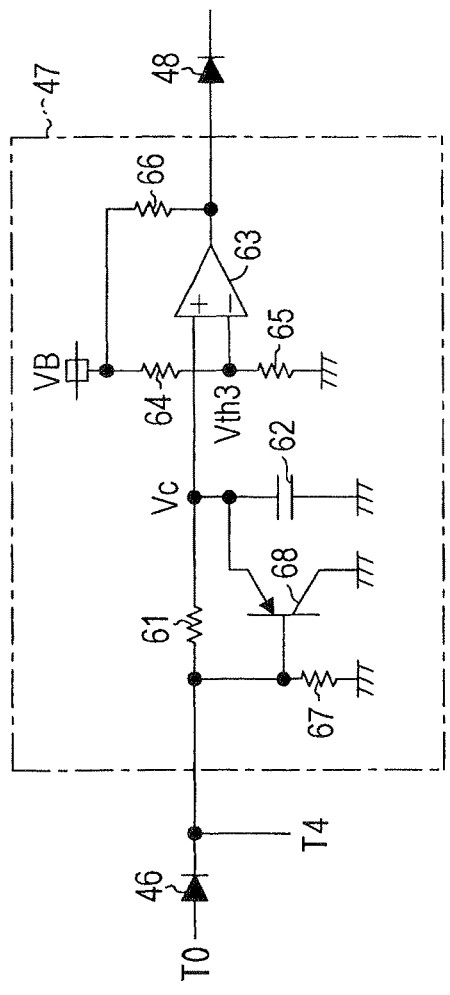
FIG. 2 is a circuit diagram showing a delay circuit in the first embodiment.

The delay circuit 47 is configured as follows. As shown in FIG. 2, the delay circuit 47 includes a resistor 61, an integration circuit, a comparator 63, two resistors 64, 65 and a pull-up resistor 66. The resistor 61 receives at its one end an input voltage, that is, the user start command signal from the diode 46 or the dummy signal from the transistor T4, to the delay circuit 47. The integration circuit is formed of a capacitor 62 connected between the other end of the resistor 61 and the ground line. A non-inverting input terminal of the comparator 63 is connected to one potential side of the capacitor 62, which is opposite to the ground line side. The resistors 64 and 65 divide the battery voltage VB and applies the divided voltage to an inverting-input terminal (negative terminal) of the comparator 63 as a comparison reference voltage Vth3. The pull-up resistor 66 is connected between the power line of the battery voltage VB and an output terminal of the comparator 63. The ratio of resistance values of the resistors 64 and 65 is set to 1:3, for example, so that the comparison reference voltage Vth3 is equal to three-fourth (¾×VB) of the battery voltage VB. The pull-up resistor 66 is provided so that the comparator 63 can output a high level signal (VB).

The delay circuit 47 includes a resistor 67 and a PNP transistor 68. The resistor 67 is connected between the one end (opposite to the capacitor 62 side) and the ground line. A base of the PNP transistor 68 is connected to a junction between the resistor 67 and the resistor 61. An emitter of the PNP transistor 68 is connected to a side opposite to the ground line side of the capacitor 62. A collector of the PNP transistor 68 is connected to the ground line.

In the delay circuit 47, an input signal to the delay circuit 47 changes from 0V to the battery voltage VB, when the transistor T0 of the ECU 12 turns on and outputs the user start command signal from the ECU 12 or when the transistor T4 outputs the dummy signal. Here, voltage drops of the transistor T0 and the transistor T4 are ignored. When the user start command signal is outputted from the ECU 12, the input signal to the delay circuit 47 becomes lower than the battery voltage VB by a forward voltage (about 0.7V) of the diode 46. Here, this forward voltage of the diode 46 is also ignored and the input signal is assumed to be the same as the battery voltage VB.

The input voltage to the delay circuit 47 is integrated by the integration circuit formed of the resistor 61 and the capacitor 62. Since the input signal corresponds to the battery voltage VB, the PNP transistor 68 turns off.

By the integration of the input signal, the voltage Vc of the capacitor 62, specifically, a voltage developed at the opposite side to the ground line side of the capacitor 62 and inputted to the non-inverting input terminal of the comparator 63, gradually increases from 0V to the same voltage as the input signal. When the voltage Vc reaches the comparison reference voltage Vth3 (=VB×¾), the output of the comparator 63, which corresponds to the output of the delay circuit 47, changes from 0V to the battery voltage VB.

The delay circuit 47 provides the measured delay time Tdm, which equals a time period or interval, which starts when the input signal changes from 0V to the battery voltage VB and ends when the output of the comparator 63 changes from 0V to the battery voltage VB. The capacitance of the capacitor 62 and resistances of the resistors 61, 64, 65 are set so that the measured delay time Tdm is, for example, between 50 ms and 100 ms.

In the delay circuit 47, when the input signal is changed from the battery voltage VB to 0V, the PNP transistor 68 turns on and discharges the capacitor 62. The voltage Vc of the capacitor 62 is changed instantly to 0V (<Vth3). When the input signal is changed from the battery voltage VB to 0V, the output of the comparator 63 (delay circuit 47) is also instantly changed to 0V.

Figure 3:
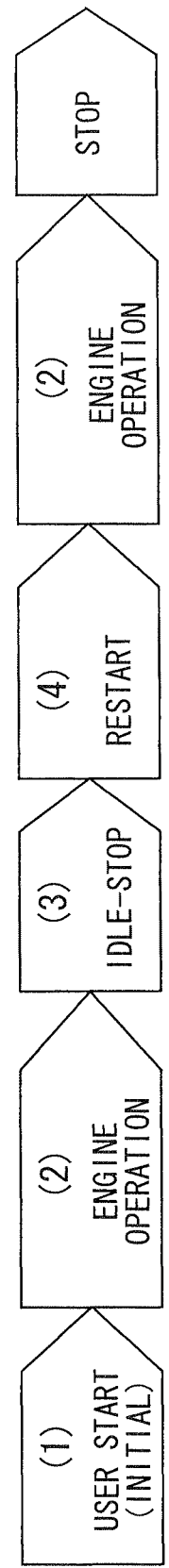
FIG. 3 is a time chart showing engine operation states in time sequence.

The processing executed by the microcomputer 15 of the ECU 12 and the microcomputer 35 of the ECU 11 are shown in FIG. 3. FIG. 3 shows a time sequence of engine operation states.

The processing of user start time, which is executed to initially start the engine 7 in accordance with the manual start operation by the driver of the vehicle, will be described. When the driver pushes the start-stop switch under the ignition-off state in the vehicle, the ignition-on state is established so that the microcomputer 15 in the ECU 12 and the microcomputer 35 in the ECU 11 are activated.

As described above, when the microcomputer 15 in the ECU 12 detects that the driver performed the manual operation for starting while satisfying the user start permission condition, it turns on the transistor T0 to output the user start command signal from the terminal Jo of the ECU 12 to the ECU 11.

In the ECU 11, the transistor T3 and the transistor T1 turn on first. With the transistor T3 being turned on, the battery voltage VB is supplied to the high potential sides of the coils 31a, 32a of the relays 31, 32. With the transistor T1 being turned on, the low potential side of the coil 31a of the relay 31 is connected to the ground line (grounded). Current flows in the coil 31a to turn on the relay 31. The pinion control solenoid 23 is energized so that the pinion gear 21 of the starter 9 is advanced from the initial position to the engagement position for engagement with the ring gear 25.

In the ECU 11, when the measured delay time Tdm of the delay circuit 47 elapses after the user start command signal is outputted from the ECU 12, the delay circuit 47 outputs the user start command signal to turn on the transistor T2. The low potential side of the coil 32a of the relay 32 is connected to the ground line. Current flows in the coil 32a to turn on the relay 32 and turn on the electromagnetic switch 19. The motor 17 is supplied with the current and starts to rotate. With the rotation force of the motor 17, the pinion gear 21 rotates the ring gear 25, that is, cranks the engine 7.

When the engine 7 is cranked, fuel is injected and ignited in the engine by an ECU provided for engine control. If the engine is a diesel engine, no ignition is required and hence only fuel is injected. It is possible that the ECU 11 or 12 is configured to perform the engine control.

When the microcomputer 15 of the ECU 12 determines that the engine 7 has attained the complete combustion, it turns off the transistor T0 and stops output of the user start command signal to the ECU 12. In the ECU 12, the transistors T1 to T3 turns off. The relays 31 and 32 turn off and the energization of the motor 17 is stopped. The pinion gear 21 is returned to the initial position so that the pinion gear 21 is disengaged from the ring gear 25. The microcomputer 15 calculates the engine rotation speed based on the rotation signal and checks whether the engine has attained the complete combustion based on the engine rotation speed.

The above-described processing corresponds to a user start operation (1) shown in FIG. 3. This user start operation is the initial start operation, because the engine 7 is started first time after the driver has stopped the engine 7. While the engine 7 is being operated, it is indicated as an engine operation (2) in FIG. 3. The user start of the engine 7 (staring the engine 7 based on the manual starting operation by the driver) is performed when the transistors T1 to T3 in the ECU 11 for operating the starter 9 are driven by the user start command signal of the ECU 12.

If the transistor T2 is turned on at the same time as the transistor T1 at the user start time, the pinion gear 21 starts to move to the engagement position at the same time as the motor 17 starts to operate. The rotation speed of the pinion gear 21 thus becomes too high at the time the pinion gear 21 contacts the ring gear 25. The pinion gear 21 and the ring gear 25 do not engage properly and cause wear. By turning on the transistor T2 later than the transistor T1 by the measured delay time Tdm provided by the delay circuit 47, the motor 17 is controlled to start its rotation with the measured delay time Tdm after the pinion gear 21 started to move towards the engagement position.

If the measured delay time Tdm is set to be excessively long, cranking the engine 7 is delayed and starting performance is degraded. Further, the pinion gear 21 generates noisy hitting sound when it contacts the ring gear 25, thus lowering commercial value of the vehicle.

For this reason, the measured delay time Tdm of the delay circuit 47 is set to be long enough without degrading the starting performance of the engine 7 and the commercial value of the vehicle. Circuit components of the delay circuit 47 are determined to satisfy that the measured delay time Tdm is in a range from 50 ms to 100 ms.

During the engine operation, when the microcomputer 35 of the ECU 11 determines that the predetermined automatic stop condition is satisfied, it performs the processing for stopping the fuel injection to the engine 7 or shutting off an air intake passage to the engine 7 thereby to automatically stop the engine 7. This automatically-stopped engine state is indicated as an idle-stop (3) in FIG. 3.

The automatic stop condition is established when all the following conditions are satisfied:

the battery voltage VB is higher than a predetermined voltage value;

the vehicle speed is lower than a predetermined speed value;

the brake vacuum pressure is higher than a predetermined pressure value;

the brake pedal is operated;

the shift position is neutral, or the shift position is other than neutral but the clutch pedal is operated;

the accelerator pedal is not operated; and more than a fixed period elapsed after the engine 7 has been automatically stopped and restarted.

When the microcomputer 35 of the ECU 11 determines that the predetermined automatic start condition is satisfied during the idle-stop state, it executes the starter control processing for starter restarting to operate the starter 9 to restart the engine 7. This is indicated as a restart state (4) in FIG. 3.

The automatic restart condition is established when any one of the following condition is satisfied:

the brake pedal is released, after the engine was stopped as the idle-stop operation under the condition that the clutch pedal is operated with the shift position at other than the neutral position;

the clutch pedal is started to be released (that is, clutch is started to be coupled by gradually releasing the clutch pedal) with the shift position at other than the neutral position, although the brake pedal is still being operated; or the shift position is changed from the neutral position to other position than the neutral position (with the clutch pedal being operated), although the brake pedal is still being operated.

The starter control processing for restarting will be described in more detail. The microcomputer 35 initially outputs all the drive signals S1 to S3 for the transistors T1 to T3 at the low level, which is the non-active level. It changes two drive signals S1 and S3 among the drive signals S1 to S3 to the high level, which is the active level, when the engine 7 is to be restarted.

The transistors T1 and T3 are turned on to turn on the relay 31. As a result, the pinion control solenoid 23 operates to move the pinion gear 21 of the starter 9 from the initial position to the engagement position for engagement with the ring gear 25.

The microcomputer 35 measures elapse of time from the time the drive signals were changed to the high level. When the measured elapse time reaches the measured delay time Tdm, the microcomputer 35 changes the drive signal S2 to the high level.

The transistor T2 is turned on to turn on the relay 32. As a result, the electromagnetic switch 19 turns on and the motor 17 starts to operate to start cranking the engine 7. When the engine 7 is cranked, the fuel injection and the ignition for the engine are performed by the other ECU provided for engine control.

The microcomputer 35 thereafter changes all the drive signals S1 to S3 to the low level, when it determines that the engine 7 attained the complete combustion. The microcomputer 35 calculates the engine rotation speed based on the rotation signal and checks whether the engine has attained the complete combustion based on the calculated rotation speed. When the engine 7 does not attain the complete combustion within a predetermined upper limit time after the drive signal S2 was changed to the high level, the microcomputer 35 determines that the engine 7 cannot be started and changes all the drive signals S1 to S3 to the low level.

In the ECU 11, all the transistors T1 to T3 turns off and the relays 31, 32 turns off. The current supply to the motor 17 is stopped and the pinion gear 21 is returned to the initial position. In FIG. 3, "stop" at the right end indicates that the engine 7 is stopped by the engine stop operation attained by the driver to stop the engine 7. In this case, the vehicle is set to the ignition-off state. The engine stop operation may, for example, be pressing the start-stop switch continuously for more than a predetermined time. This is also an ignition-off operation setting the vehicle in the ignition-off state.

The microcomputer 35 of the ECU 11 executes to detect a delay function abnormality, which is an abnormality in delay function of the delay circuit 47 and indicates that the measured delay time Tdm is not normal, at each of the user start time of the engine 7 and the predetermined timing other than the user start time. This processing will be described below.

First, user start time abnormality detection processing for detecting delay function abnormality at the user start time will be described with reference to FIG. 4. This user start time abnormality detection processing will be started when the microcomputer 35 is activated. The microcomputer 35 executes not only the user start time abnormality detection processing but also other processing in parallel relation by multitasking.

Figure 4:
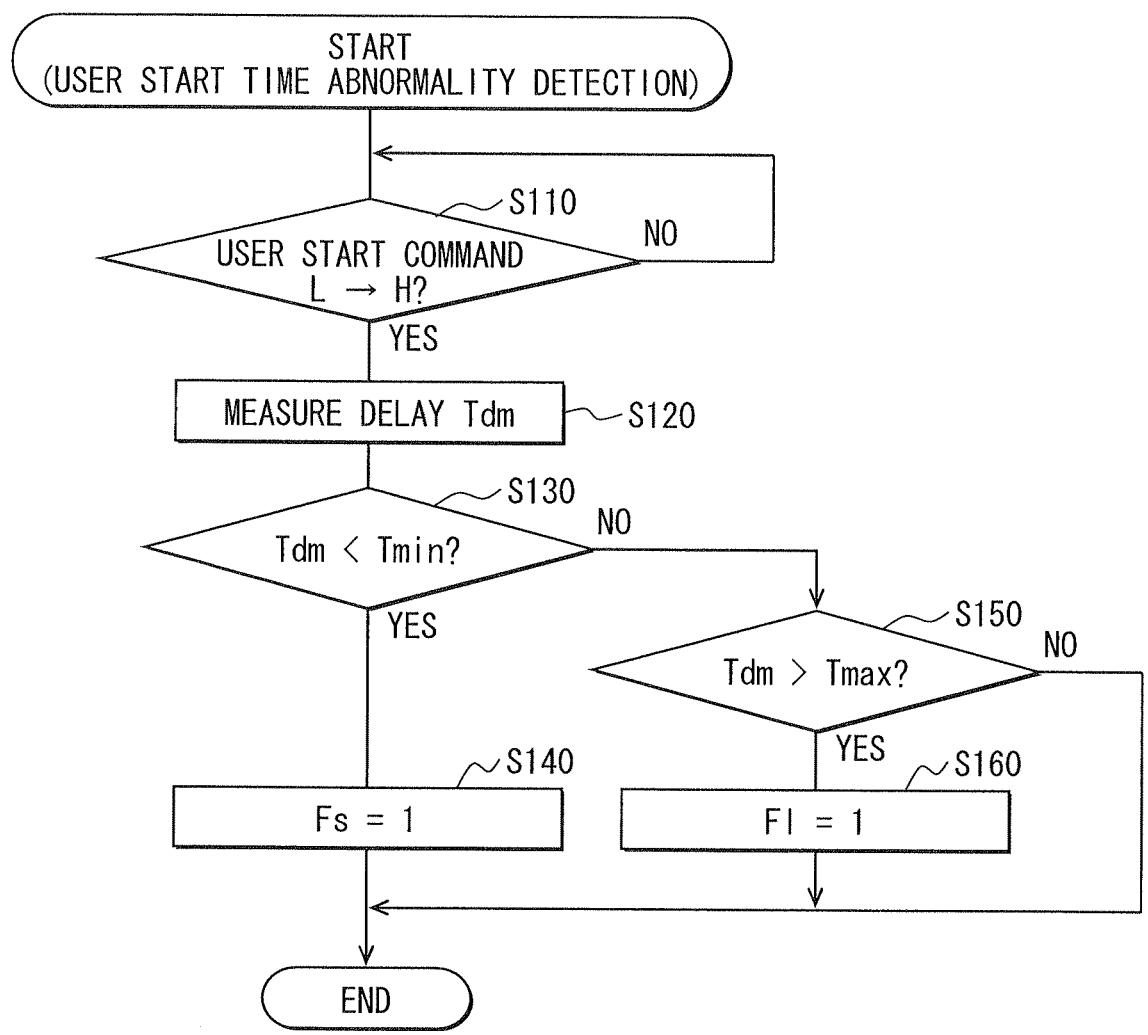
FIG. 4 is a flowchart showing user start time abnormality detection processing executed in the first embodiment.

As shown in FIG. 4, the microcomputer 35 first checks at S110 whether the user start command signal is outputted from the ECU 12 to the ECU 11, specifically, the user start command signal is changed from the low level (L: 0V) to the high level (H: VB). The high level of the user start command signal corresponds to the battery voltage VB. Whether the user start command signal is changed from the low level to the high level is checked based on whether the output CM1 of the comparator 51 is changed from the low level to the high level.

If it is determined that the user start command signal is not changed from the low level to the high level (S110: NO), S110 is repeated. If it is determined that the user start command signal is changed from the low level to the high level (S110: YES), S120 is executed to start measuring an elapse of time from when the user start command signal is changed to the high level to when the output CM2 of the comparator 56 is changed from the high level to the low level, as a delay time Tdm (that is, time interval until the transistor T2 is turned on).

The measured delay time Tdm measured by measuring processing of S120 indicates the delay time, which starts when the user start command signal is outputted from the ECU 12 to turn on the transistor T1 and applied to the delay circuit 47 and ends when the transistor T2 is turned on. This corresponds to an actual delay time provided by the delay circuit 47.

When the output CM2 of the comparator 56 changes from the high level to the low level, measurement of the measured delay time Tdm is finished and S130 is executed. It is checked at S130 whether the measured delay time Tdm is shorter than a minimum allowable value Tmin (50 ms) which is a minimum value of the normal range (50 ms to 100 ms) of the measured delay time Tdm. If it is determined that the measured delay time Tdm is shorter than the minimum allowable value Tmin (Tdm<Tmin), it is determined that the measured delay time Tdm of the delay circuit 47 has abnormality, and S140 is executed. This abnormality is referred to as a short-delay abnormality, which indicates that the measured delay time is too short.

At S140, a flag Fs is set to "1," which indicates that the short-delay abnormality is present. At the same time, abnormality detection timing information, which indicates that the flag Fs is set to "1" at the user start time, is also stored. After S140, the user start time abnormality detection processing is finished.

If it is determined at S130 that the measure delay time Tdm is not shorter than the minimum allowable value Tmin, S150 is executed. It is checked further at S150 whether the measured delay time Tdm is longer than a maximum allowable value Tmax (100 ms), which is a maximum value of the normal range (50 ms to 100 ms) of the measured delay time Tdm. If it is determined that the measure delay time Tdm is longer than the maximum allowable value Tmax (Tdm>Tmax), it is determined that the measured delay time Tdm of the delay circuit 47 has abnormality and S160 is executed. This abnormality is referred to as a long-delay abnormality, which indicates that the measured delay time Tdm is too long.

At S160, a flag Fl is set to "1" which indicates that the long-delay abnormality is present. At the same time, abnormality detection timing information, which indicates that the flag Fl is set to "1" at the user start time, is also stored. After S160, the user start time abnormality detection processing is finished.

If it is determined at S150 that the measure delay time Tdm is not longer than the maximum allowable value Tmax, the user start time abnormality detection processing is finished by determining that no abnormality is present. As described above, in the user start time abnormality detection processing, the measured delay time Tdm from when the user start command signal is applied from the ECU 12 to the delay circuit 47 to when the transistor T2 is turned on is measured as the actual delay time Tdm. If the measured delay time Tdm is shorter than the minimum allowable value Tmin, the flag Fs is set to "1" (S140). If the measured delay time Tdm is longer than the maximum allowable value Tmax, the flag Fl is set to "1" (S160). The initial values of the flags Fs and Fl are both 0.

Figure 5:
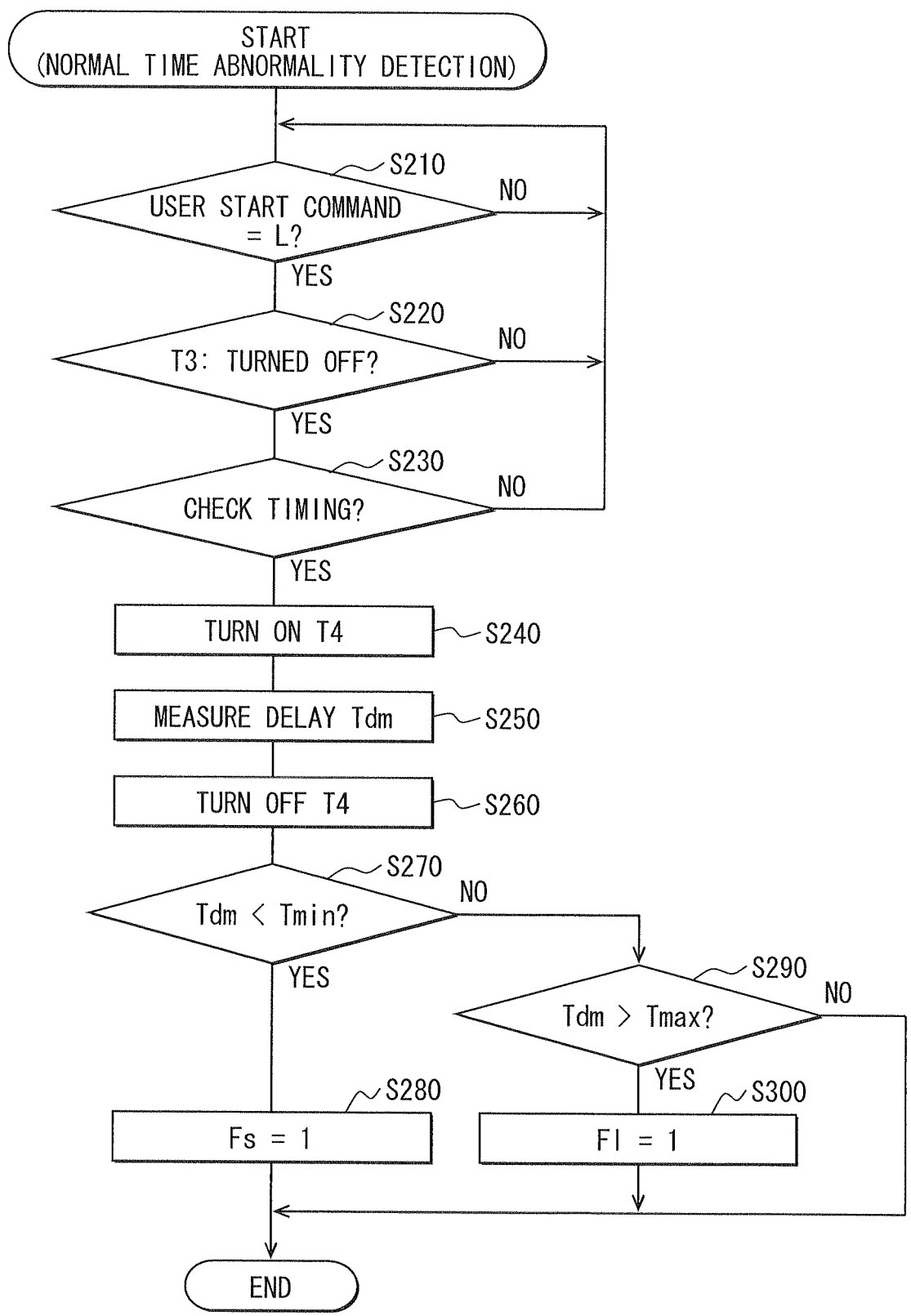
FIG. 5 is a flowchart showing non-start time abnormality detection processing executed in the first embodiment.

Normal time abnormality detection processing, which is for detecting abnormality in the delay function at a predetermined timing other than the user start time, will be described with reference to FIG. 5. The normal time abnormality detection processing shown in FIG. 5 is started also when the microcomputer 35 is activated. The microcomputer 35 executes not only the normal time abnormality detection processing but also other processing in parallel relation by multitasking.

As shown in FIG. 5, after starting the normal time abnormality detection processing, the microcomputer 35 checks at S120 whether the user start command signal applied to the ECU 12 from the ECU 11 is at the low level (0V). Whether the user start command signal is low is determined by checking whether the output CM1 of the comparator 51 is low.

If it is determined that the user start command signal is not at the low level (S210: NO), S210 is repeated. If it is determined that the user start command signal is at the low level (S210: YES), S220 is executed to check whether the transistor T3 is being turned off by the microcomputer 35 (that is, the output level of the drive signal S3 is low).

If it is determined that the transistor T3 is not being turned off (rather being turned on) (S220: NO), S210 is repeated. If it is determined that the transistor T3 is being turned off (S220: YES), S230 is executed.

Thus S230 is executed, when the engine 7 is not being started (that is, normal time, which is not the user start time nor the restart time from idle-stop). The power supply from the transistor T3 to the coils 31a, 32a is interrupted to disable the relays 31, 32 to turn on.

At S230 it is checked whether it is the check timing now. The check timing means a timing at which S240 and subsequent steps for detecting the delay function abnormality (that is, the delay function is diagnosed). The timing corresponds to each of the following timings [1a], [1b], [1c], [2a], [2b], [3] and [4]. The timings [1a], [1b] and [1c] occur while the engine is being operated. Therefore only one or two of these may be selected. The timings [2a] and [2b] occur while the engine is in the idle-stop state. Therefore either one of these may be selected.

[1a] During the operation of the engine 7, and immediately after the engine 7 is started by the start operation by the driver, that is, immediately after being started by the user. If it is determined that the engine 7 attained the complete combustion from the stop state while the microcomputer 35 is maintaining the drive signal S3 for the transistor T3 at the low level, this timing may be determined to be the timing [1a].

[1b] Immediately before automatically stopping the engine 7 by determining that the automatic stop condition is satisfied during the operation of the engine 7, that is, immediately before performing the idle-stop operation.

[1c] Elapse of a predetermined fixed interval during the operation of the engine 7.

[2a] Immediately after performing the idle-stop operation.

[2b] Elapse of a predetermined fixed interval during the idle-stop operation.

[3] Before the user start of the engine 7

Specifically, in the period that the user start command signal from the ECU 12 is not changed to the high level after the vehicle is set to the ignition-on state and the microcomputer 35 is activated, S230 became the first step to be executed.

Whether the user start command signal is changed to the high level may be checked based on the output CM1 of the comparator 51.

[4] After the engine 7 is stopped by the user, that is, the vehicle is set to the ignition-off state by the ignition-off operation by the driver.

Specifically, in the period from when the ignition-on state is changed to the ignition-off state to when the main relay is turned off, S230 became the first step to be executed.

Since the state signal indicating whether it is presently the ignition-on state is inputted to the microcomputer 35, the microcomputer 35 is capable of checking whether it is presently the ignition-on state based on the state signal.

If it is determined at S230 that it is presently not the check timing, S210 is executed. If it is determined that it is the check timing (S230: YES), S240 is executed.

At S240, the transistor T4 for outputting the dummy signal is turned on. At S250 delay time measurement processing is executed. In this S250, the elapse of time from when the transistor T4 is turned on to when the output CM2 of the comparator 56 is changed from the high level to the low level, that is, time until the transistor T2 is turned on, is measured as the actual measured delay time Tdm.

When this measurement processing of S250 is executed, the transistor T3 is turned off but the terminal J2 is pulled up to the battery voltage VB. As a result, when the transistor T2 is changed from the off-state to the on-state, the output CM2 of the comparator 56 is changed from the high level to the low level.

The measure delay time Tdm measured by the measurement processing of S25 is the delay time from when the dummy signal is applied from the transistor T4 to the delay circuit 47 to when the transistor T2 turns on. This delay time is assumed to be the same as the actual delay time of the delay circuit 47 at the user start time.

When the output CM2 of the comparator 56 changes from the high level to the low level and the measurement of the measured delay time Tdm is finished, the transistor T4 is turned off at S260 and then S270 is executed. It is checked at S270 whether the measured delay time Tdm is shorter than the minimum allowable value Tmin (50 ms) of the measured delay time Tdm. If it is determined that the measured delay time Tdm is shorter than the minimum allowable value (Tdm<Tmin), it is determined that the short-delay abnormality is present. Then S280 is executed similarly to S140.

At S280, the flag Fs is set to "1" and also the abnormality detection timing information, which indicates the timing of setting the flag Fs to "1," is stored. This information indicates one of the timings [1a], [1b], [1c], [2a], [2b], [3] and [4], at which the short-delay abnormality is detected. Thus the normal time abnormality detection processing is finished.

If it is determined at S270 that the measured delay time Tdm is not shorter than the minimum allowable value Tmin, S290 is executed. It is checked at S290 whether the measured delay time Tdm is longer than the maximum allowable value Tmax (100 ms) of the measured delay time Tdm. If it is determined that the measured delay time Tdm is longer than the maximum allowable value (Tdm>Tmax), it is determined that the long-delay abnormality is present. Then S300 is executed.

At S300, the flag Fl is set to "1" and also the abnormality detection timing information, which indicates the timing of setting the flag Fl to "1", is stored. This information indicates one of the timings [1a], [1b], [1c], [2a], [2b], [3] and [4], at which the long-delay abnormality is detected. Thus the normal time abnormality detection processing is finished. If it is determined at S290 that the measured delay time Tdm is not longer than the maximum allowable value Tmax, it is determined that no abnormality is present, thus finishing the normal time abnormality detection processing.

As described above, in the normal time abnormality detection processing, the dummy signal is applied from the transistor T4 to the delay circuit 47 (S240) in a case that the transistor T3 is in the off-state and it is not the engine start time. In this case, even when the transistors T1, T2 are turned on, the relays 31, 32 are disabled to turn on and both the motor 17 and the pinion control solenoid 23 do not operate. The measured delay time Tdm from when the dummy signal is applied to when the transistor T2 turns on, the actual delay time caused by the delay circuit 47 is measured. Similarly to the start time abnormality detection processing shown in FIG. 4, the flag Fs is set to "1" (S280), if the measured delay time Tdm is shorter than the minimum allowable value T min. The flag Fl is set to "1" (S300), if the measured delay time Tdm is longer than the maximum allowable value Tmax.

Figure 6:
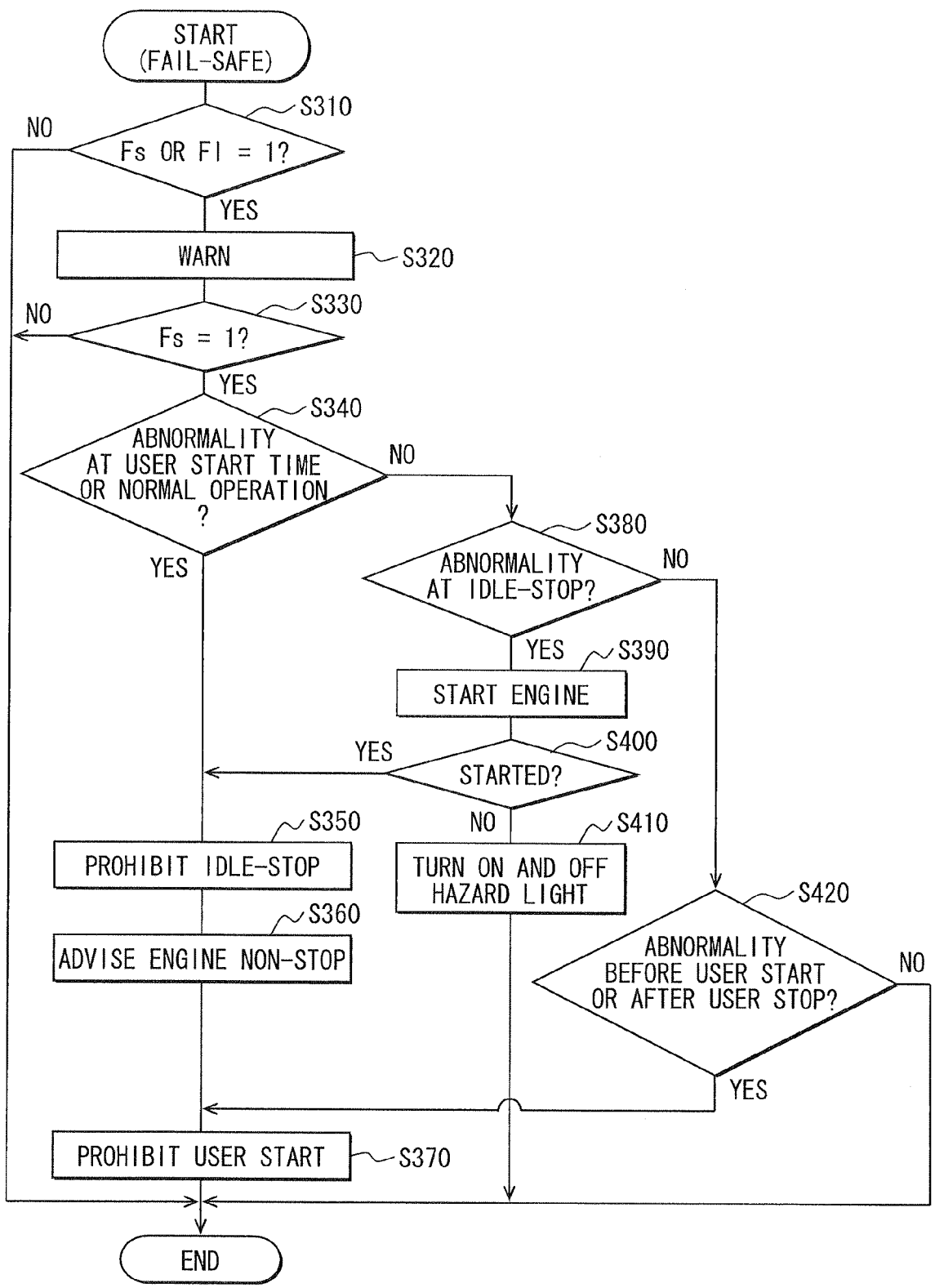
FIG. 6 is a flowchart showing fail-safe processing executed in the first embodiment.

Fail-safe processing executed by the ECU 11 will be described with reference to FIG. 6. The fail-safe processing shown in FIG. 6 is executed immediately after each processing of FIG. 4 and FIG. 5 is executed. In FIG. 6 and other figures, a user is a vehicle user and the driver.

As shown in FIG. 6, after starting the fail-safe processing, the microcomputer 35 first checks at S310 whether any one of the flags Fs and Fl is "1." If it is determined that both flags Fs and Fl are not "1", it means that no delay function abnormality is detected and hence this fail-safe processing is finished.

If it is determined at S310 that one of the flags Fs and Fl is "1" indicating presence of the delay function abnormality, S320 is executed to execute warning processing for warning the driver of the abnormality, that is, warning to the user in the vehicle.

Specifically, a warning light may be activated or a buzzer may be blown. A message indicting "the starter system has abnormality and needs be repaired" may be provided visually on a display or outputted by sound from a speaker.

At next S330, it is checked whether the flag Fs is "1." If the flag Fs is not "1," this fail-safe processing is finished. If the flag Fl is "1," that is, if the long-delay abnormality is detected, the fail-safe processing is finished by executing only the warning processing of S320.

In case of the long-delay abnormality, as described above, the starting performance of the engine 7 is degraded or the hitting sound caused when the pinion gear 21 contacts the ring gear 25 becomes noisy. However, it does not cause wear of the pinion gear 21 and the ring gear 25, which is caused in case of the short-delay abnormality. For this reason, only the warning processing (S320) is executed.

If it is determined at S330 that the flag Fs is "1," that is, the short-delay abnormality is detected, S340 is executed for other fail-safe processing in addition to the warning processing of S320.

It is checked at S340 whether the timing of detection of the short-delay abnormality is in the user start time or the engine operation time based on the abnormality detection timing information stored when the flag Fs is set to "1." If the timing of detection of the short-delay abnormality is in the user start time or the engine operation time, S350 is executed. At S350, the idle-stop, that is, automatic stop of the engine 7, is prohibited. Specifically an idle-stop prohibition flag is set to "1." That is, if the idle-stop prohibition flag is "1," the microcomputer 35 does not check the automatic stop condition during the operation of the engine 7 or does not execute processing, which is provided for stopping the engine 7, even if the automatic stop condition is satisfied.

At next S360, advice processing is executed so that the driver is advised not to stop the engine 7 (processing to advise non-stopping of the engine). Specifically, a message indicating "the engine will not be able to be started again if stopped" may be displayed on a display device in sentences or outputted by voice from a speaker in the vehicle. Alternatively, the engine 7 may be disabled to be stopped unless the start-stop switch is continuously operated for more than a normal operation time. At next S370, the user start operation of the engine 7 is also prohibited. That is, current supply to the coil 23a of the pinion control solenoid 23 and the motor 17 is disabled, that is, the pinion control solenoid 23 and the motor 17 are disabled to operate, even when the driver performs the starting operation.

Specifically, in case that the microcomputer 35 of the ECU 11 and the microcomputer 15 of the ECU 12 are connected via a communication line for communication therebetween, for example, a command may be transmitted to the microcomputer 15 of the ECU 12 to prohibit the output of the user start command signal. Alternatively, the user start command signal may be invalidated by preventing the user start command signal of the ECU 12 from being applied to the diodes 44 to 46. This may be attained by providing a switching element in the signal path from the terminal 31 to the resistor 37 (FIG. 1) and maintaining this switching element in the off-state.

After S370, the fail-safe processing is finished. If it is determined at S340 that the timing of detection of the short-delay abnormality is not in the user start time nor the engine operation time (S340: NO), S380 is executed.

It is checked at S380 whether the timing of detection of the short-delay abnormality is in the idle-stop state based on the abnormality detection timing information stored when the flag Fs is set to "1." If the timing of detection of the short-delay abnormality is in the idle-stop state, S390 is executed.

At S390, processing for starting the engine 7 is executed. Specifically, after confirming that starting the engine 7 will not cause any adversary end result (for example, the shift position is at the neutral position or the clutch pedal is pressed down), the starter control processing for restarting may be executed to try starting the engine 7.

At next S400, it is checked whether the engine 7 was started. If it is determined that the engine 7 was started, S350 to S370 described above are executed thus finishing the fail-safe processing. Here, the engine 7 is determined to have been started when the engine rotation speed calculated based on the rotation signal attained the predetermined rotation value.

If it is determined at S400 that the engine 7 was not started, S410 is executed to provide a caution to drivers of other vehicles. For example, a hazard light of the vehicle is turned on and off to notify the other drivers of surrounding vehicles of the abnormality. The fail-safe processing is then finished.

If it is determined at S380 that the timing of detection of the short-delay abnormality is not in the idle-stop state, S420 is executed. It is checked at S420 whether the timing of detection of the short-delay abnormality is before the engine 7 is started by the user or after the engine 7 is stopped by the user, based on the abnormality detection timing information stored when the flag Fs is set to "1." If the timing of detection of the short-delay abnormality is before the user started the engine 7 or after the user stopped the engine 7, 5370 is executed as described above and then the fail-safe processing is finished.

If it is determined at S420, that the timing of detection of the short-delay abnormality is not before the engine 7 is started by the user nor after the engine 7 is stopped by the user (5420: NO), the fail-safe processing is finished. S420 is provided for confirmation and hence its check result will be expected to result in YES. That is, if the check result at S420 is NO, a different abnormality other than the delay function abnormality is expected to be present.

The fail-safe processing of FIG. 6 described above executes different fail-safe processing based on types of the delay function abnormality (short-delay abnormality and long-delay abnormality) detected by the processing of FIG. 4 and FIG. 5 and the abnormality detection timing (timing of detection of abnormality). The relation among the executed fail-safe processing, the types of the delay function abnormality and the abnormality detection timing are summarized as shown in FIG. 7.

In the fail-safe processing of FIG. 6, if the flag Fs or the flag Fl is "1" (S310: YES), it means that the delay function abnormality is detected. Even if the abnormality is detected before the engine 7 is started by the user, when the engine 7 is being started by the user, when the engine 7 is being operated, when the engine 7 is in the idle-stop state or after the engine 7 is stopped by the user, that is, irrespective of the timing of detection, the warning processing (warning to the user) is executed (S320). If the delay function abnormality is detected after the engine 7 is stopped by the user, the warning processing may be terminated at a predetermined time point, for example, when the vehicle is locked by a key or a predetermined time after the vehicle key-lock operation, so that power consumption of the battery 16 is reduced.

If the flag Fs is "1" (S330: YES) in particular, it means that the short-delay abnormality among the plural delay function abnormalities is detected. In this case, different processing is executed based on the abnormality detection timing.

If the short-delay abnormality is detected when the engine 7 is started by the user or operating normally (S340: YES), the pinion gear 21 and the ring gear 25 may have already been worn and the engine 7 may not be started next time. If the engine 7 is stopped by the idle-stop control or the driver's stop operation, the engine 7 may not be started again thereafter and the vehicle may not be able to move. Therefore, the idle-stop is prohibited (S350) and further the advice processing is executed (S360) to encourage the drive not to stop the engine.

If the starter 9 is operated further by the start operation by the driver, the wear of the pinion gear 21 and the ring gear 25 will develop further. Therefore, the user start is prohibited (S370).

If the short-delay abnormality is detected during the idle-stop operation of the engine 7 (S380: YES), it is likely that the pinion gear 21 and the ring gear 25 have already worn and the engine 7 may not be restarted. Therefore, the processing for starting the engine 7 is executed (S390) to check whether the engine 7 can be started.

If the engine 7 is started successfully (S400: YES), the situation is the same as the case that the short-delay abnormality is detected during the operation of the engine 7. Therefore, the idle-stop operation is prohibited (S350), the driver is advised not to stop the engine (S360) and further prohibit the subsequent starting by the user (S370).

If the engine 7 is not started successfully (S400: NO), the hazard light of the vehicle is turned on and off to provide the drivers of other vehicles with the caution that the subject vehicle is disabled to travel. Attention attraction processing of S410 may be generation of sound or display of a visual message on the display device to be viewed from the outside. If the short-delay abnormality is detected before the engine 7 is started by the user or after the engine 7 is stopped (after ignition-off) by the user (S420: YES), the user is disabled to start the engine 7 (S370) so that the pinion gear 21 and the ring gear 25 wear further.

According to the starter control system, in which the power supply to the motor 17 is started after the elapse of the pre-determine delay time Td from the power supply to the coil 23a of the pinion control solenoid 23 started by the start operation of the driver, the abnormality of the time difference control performed at the time of user start operation is detected as the delay function abnormality. As summarized in FIG. 7, appropriate fail-safe processing is performed in accordance with the types of the delay function abnormality, that is, the long-delay abnormality or the short-delay abnormality, as well as the timing of detection of the abnormality. Thus reliability and commercial value of a vehicle can be improved.

The pinion control solenoid 23 corresponds to a pinion control actuator, the electromagnetic switch 19 corresponds to a motor control switch part, the transistor T1 corresponds to a pinion drive transistor and a first drive part, the transistor T2 corresponds to a motor drive transistor, the transistor T2 and the delay circuit 47 correspond to a second drive part, the turn-on operation of the transistor T1 corresponds to a first drive operation, the turn-on operation of the transistor T2 corresponds to a second drive operation, and the transistor T3 corresponds to a motor energization prohibition part. The ECU 11 and the ECU 12 correspond to a starter control apparatus of a starter control system, and the microcomputer 35 of the ECU 11 forms a part of the starter control apparatus and also corresponds to an idle-stop control part The microcomputer 35 of the ECU 11, the monitor circuits M1, M2 and the transistor T4 correspond to an abnormality detection apparatus. Of the processing executed by the microcomputer 35, the processing of FIG. 4 corresponds to a start time abnormality check part and the processing S240 to S300 of FIG. 5 corresponds to a normal time abnormality check part. The actual measured delay time Tdm measured by S250 of FIG. 5 corresponds to a dummy signal input delay time. S210 to S230 of FIG. 5 correspond to processing for performing the normal time abnormality check part, which is executed during the engine operation, during the idle-stop, after the engine is stopped by the engine stop operation of the driver, or after the vehicle is set to the ignition-on state and before the user start command signal is generated.

The electromagnetic switch 19 corresponds to the motor control switch as well. The transistor T1 corresponds to the first drive part as well. The transistor T2 corresponds to the second drive switch as well. The user start command signal corresponds to a start command as well.

The microcomputer 35 executes the above-described starter control processing for restarting at the time of restarting the engine 7 from the idle-stop state so that the ECU 11 sets the drive signal S1 for the transistor T1 to the high level and sets the drive signal S2 for the transistor T2 to the high level after the elapse of the predetermined delay time. For this reason, it may also check the delay time at the engine restart time, that is, the time difference control at the time of restarting the engine.

Specifically, for example, the following configuration and processing (a) to (c) may be added. This example refers to a case that the microcomputer 15 of the ECU 12 executes the abnormality detection processing.

(a) The drive signals S1, S2 outputted from the microcomputer 35 are inputted to the microcomputer 15 of the ECU 12.

(b) The microcomputer 15 of the ECU 12 executes the following processing by partially modifying the processing of FIG. 4. That is, the microcomputer 15 checks at S110 whether the drive signal S1 has changed from the low level to the high level. If the drive signal S1 changed to the high level, the microcomputer 15 measures the period from the change of the drive signal S1 to the change of the drive signal S2 to the high level as the measured delay time Tdm. After finishing the measurement of the actual delay time Tdm, the microcomputer 15 executes the same processing as S130 to 5160 shown in FIG. 4.

(c) The microcomputer 15 of the ECU 12 executes the warning processing similar to that of S320 of FIG. 6, in case that the flag Fl is set to "1" in the processing (b). The microcomputer 15 executes the warning processing similar to that of S320 of FIG. 6, in case that the flag Fs is set to "1" in the processing (b). The microcomputer 15 further executes the similar processing (for prohibiting the idle-stop, for advising the driver not t stop the engine, and for prohibiting the starting of the engine by the user) S350, S360 and S370 of FIG. 6.

In this case, as the processing for prohibiting the idle-stop, a command may be transmitted the microcomputer 35 of the ECU 11 so that the microcomputer 35 does not automatically stop the engine 7. Further, as the user start prohibition processing, prohibition processing for prohibiting the microcomputer 15 from outputting the user start command signal (from turning on the transistor T0) may be executed.

In the modification (a), the voltages developed at the terminals J1, J2 of the ECU 11 (drain voltages of the transistors T1 and T2) may be inputted to the ECU 12 in place of the drive signals S1, S2. In this case, the measured delay time Tdm may be measured by providing in the ECU 12 two monitor circuits similar to the monitor circuits M1, M2. The voltages of the terminals J1, J2 of monitor circuits are inputted and the microcomputer 15 measures the period from the output change from the high level to the low level time of the monitor circuit, to which the voltage of the terminal J1 is inputted, to the output change from the high level to the low level of the monitor circuit, to which the voltage of the terminal J2 is applied.

The above modification is also applicable to a case, in which the time difference control at the user start time is also executed by the microcomputer 35 of the ECU 11.

(Second Embodiment)

Figure 8:
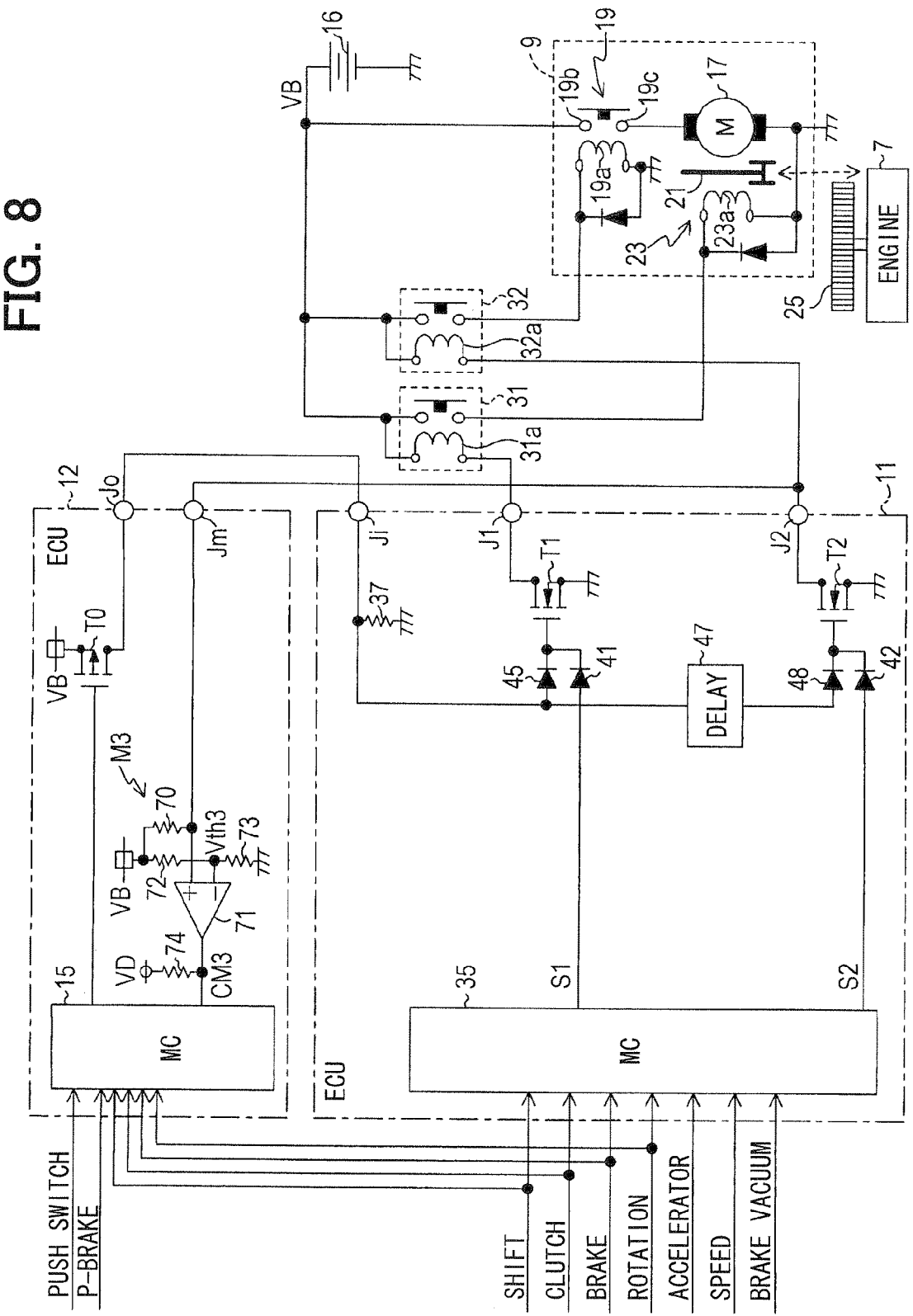
FIG. 8 is a circuit diagram showing a starter control system according to a second embodiment.
Figure 9:
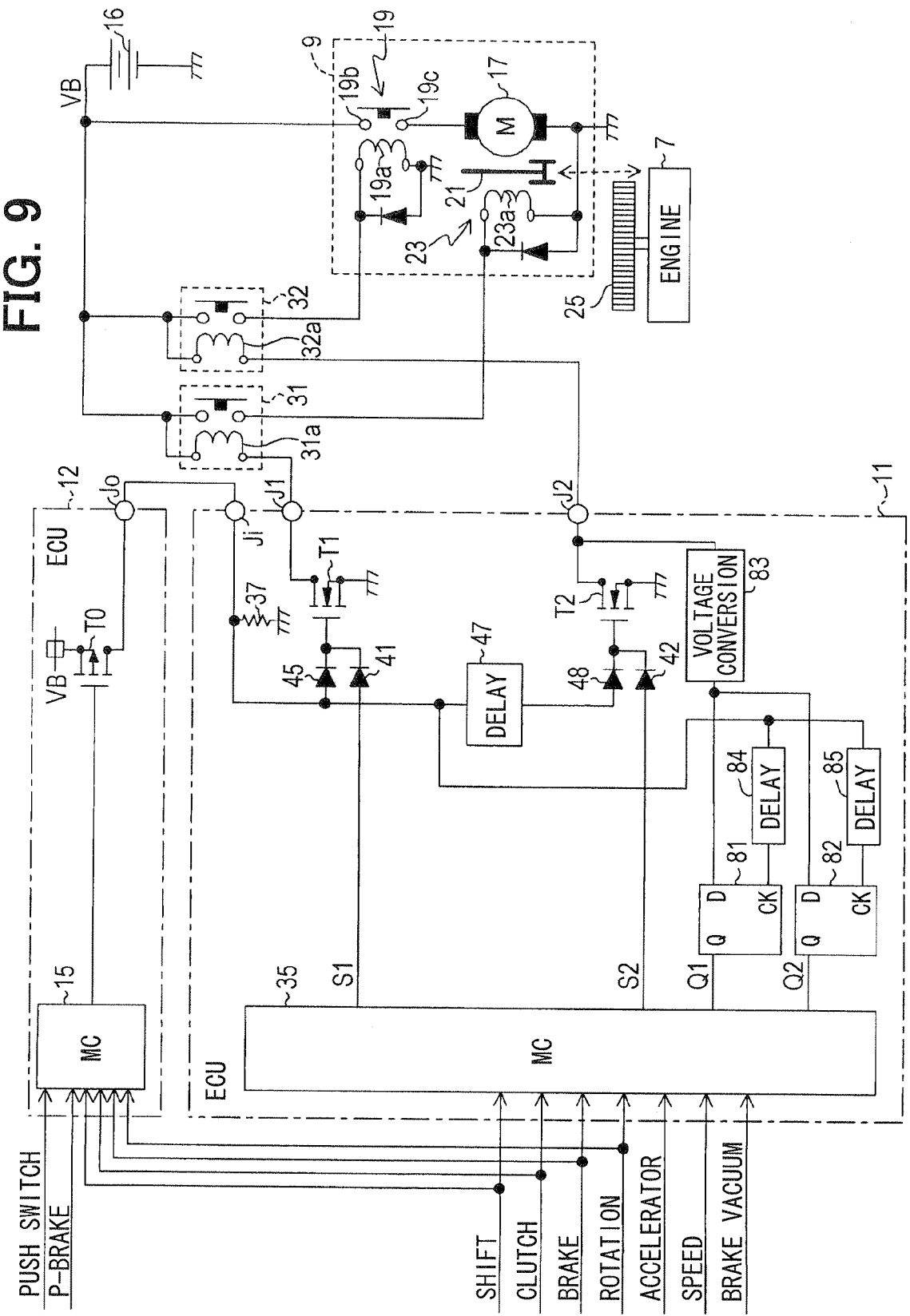
FIG. 9 is a circuit diagram showing a starter control system according to a third embodiment.

Referring to FIG. 8, a starter control system according to a second embodiment is different from the first embodiment as follows. The ECU 11 does not include, among the structural elements shown in FIG. 1, the transistor T3, the drive circuit 49, the transistor T4, the diodes 43, 44, 46, the monitor circuits M1, M2 and the terminal J3.

In the ECU 11, therefore, the user start command signal is inputted from the ECU 12 to the delay circuit 47 directly without through the diode 46. The upstream ends of the coils 31a, 32a of the relays 31, 32 are connected to the power line of the battery voltage VB at the outside of the ECU 11. The microcomputer 35 of the ECU 11 therefore does not output the drive signal S3 in the starter control processing for restarting, which is executed when the engine is restarted from the idle-stop state. The second embodiment corresponds to the first embodiment, assuming that the drive signal S3 in the first embodiment is maintained at the high level, that is, the transistor T3 is maintained in the on-state.

The ECU 12 has a terminal Jm and the voltage of the terminal J2 of the ECU 11 is inputted to the terminal Jm. The ECU 12 is provided with a monitor circuit M3, which is similar to the monitor circuit M2 shown in FIG. 1.

The monitor circuit M3 includes a pull-up resistor 70, a comparator 71, two resistors 72, 73 and a pull-up resistor 74. The pull-up resistor 70 is connected to the power line of the battery voltage VB and the terminal Jm. A non-inverting input terminal of the comparator 71 is connected to the terminal Jm. The resistors 72 and 73 divide the battery voltage VB and apply the divided voltage as a comparison reference voltage Vth3 to an inverting input terminal of the comparator 71. The pull-up resistor 74 is connected between the power line of the fixed voltage VD (5V) and an output terminal of the comparator 71. The ratio of resistance values of the resistors 72, 73 of the monitor circuit M1 is set to 1:1, for example, so that the comparison reference voltage Vth3 becomes equal to one-half (VB/2) of the battery voltage VB.

As a result, when the transistor T2 of the ECU 11 turns on from the off-state and the voltage at the terminal 32 changes from the battery voltage VB to a voltage (0V if the on-resistance of the transistor T2 is ignored) lower than VB/2, an output CM3 of the comparator 71, which is an output of the monitor circuit M3, changes from the high level to the low level. This output CM3 is inputted to the microcomputer 15.

The microcomputer 15 of the ECU 12 executes user start time abnormality detection processing, which is a modification of the processing shown in FIG. 4 described below, so that the delay function abnormality is detected at the user start time. The user start time abnormality detection processing is started when the microcomputer 15 is activated. The microcomputer 15 executes not only the user start time abnormality detection processing but also other processing in parallel relation by multitasking.

That is, the microcomputer 15 checks at S110 whether the user start command signal is outputted, specifically whether the user start command signal was changed from the low level to the high level, that is, whether the transistor T0 was turned on. If the user start command signal is outputted, the delay period Td is measured at S120. The measured delay time Tdm is a period from when the user start command signal is outputted to when the output CM3 of the comparator 71 is changed from the high level to the low level, that is, the period until the transistor T2 of the ECU 11 is turned on. After the measurement of the measured delay time Tdm, the microcomputer 15 executes the same processing as S130 to S160 shown in FIG. 4.

The microcomputer 15 of the ECU 12 executes similar warning processing as S320 of FIG. 6, when the flag Fl is set to "1" in the user start time abnormality detection processing. The microcomputer 15 executes similar warning processing as S320 of FIG. 6, when the flag Fs is set to "1" in the user start time abnormality detection processing. In addition, it executes similar processing (idle-stop prohibition processing, engine non-stop advice processing and user start prohibition processing) as S350, S360 and S370 of FIG. 6.

Similarly to the modification described above, as an example of the idle-stop prohibition processing, a command, which prohibits automatic stop of the engine, may be transmitted to the microcomputer 35 of the ECU 11. As an example of the user start prohibition processing, prohibition processing may be executed so that the user start command signal output processing is not executed in the microcomputer 15. In the second embodiment, the microcomputer 35 of the ECU 11 does not execute the processing of FIG. 4 to FIG. 6.

If the microcomputer 35 of the ECU 11 needs comparatively long period to be activated after the battery voltage VB is supplied to the ECUs 11 and 12, the microcomputer 35 may not be activated yet when the user start command signal is outputted from the ECU 12 to the ECU 11 at the user start time. According to the second embodiment, even in such a system configuration, the microcomputer 15 of the ECU 12 can detect the delay function abnormality at the user start time and execute different fail-safe processing in correspondence to types of abnormalities.

(Third Embodiment)

Referring to FIG. 3, a starter control system according to a third embodiment is different from the second embodiment as follows.

The ECU 12 does not include the terminal Jm and the monitor circuit M3. The microcomputer 15 of the ECU 12 does not execute the user start time abnormality detection processing. This is similar to the first embodiment. The ECU 11 includes two flip-flops 81, 82, a voltage level conversion circuit 83 and delay circuits 84, 85. The voltage level conversion circuit 83 converts the voltage developed at the terminal J2 into digital signals and supplies them to data terminals D of the flip-flops 81, 82. The digital signal is either a high level, which is an operating voltage of the flip-flops 81, 82, or a low level, which is 0V. The delay circuits 84, 85 receive the user start command signal from the ECU 12.

The flip-flops 81, 82 operate with a fixed voltage (5V) generated inside the ECU 11 from the battery voltage VB. The voltage level conversion circuit 83 thus converts the voltage of the terminal 32 into the digital signal, which is the high level of 5V or the low level of 0V, and inputs the digital signal to the data terminals D of the flip-flops 81, 82.

The voltage level conversion circuit 83 has the similar circuit configuration as the monitor circuit M3 shown in FIG. 8. It outputs a 5V signal as the high level signal to the data terminals D of the flip-flops 81, 82, when the voltage at the terminal J2 is higher than a comparison reference voltage between 0V and the battery voltage VB. It outputs a 0V signal as the low level signal to the data terminals D of the flip-flops 81, 82, when the voltage at the terminal J2 is lower than the comparison reference voltage.

The delay circuits 84, 85 have the similar circuit configuration as the delay circuit 47 shown in FIG. 2. However, in comparison to the circuit configuration of FIG. 2, the voltage connected with the resistor 66 is not the battery voltage VB but is 5V.

Each delay circuit 84, 85 delays the user start command signal (voltage value is the same as the battery voltage VB) supplied from the ECU 12 by a predetermined delay time and outputs it after changing the level to 5V.

The output of the delay circuit 84 is inputted to a clock terminal CK of the flip-flop 81. The output of the delay circuit 85 is inputted to a clock terminal CK of the flip-flop 82.

A delay time Td1 of the delay circuit 84 is set to be a little shorter than the minimum allowable value Tmin of the delay time Td of the delay circuit 47. A delay time Td2 of the delay circuit 86 is set to be a little longer than the maximum allowable value Tmax of the delay time Td of the delay circuit 47.

Thus the flip-flop 81 latches the on/off state of the transistor T2 (that is, state of the relay 32) at the time of elapse of the delay time Td1 (<Tmin) of the delay circuit 84 after the user start command signal is outputted from the ECU 12.

If the transistor T2 is not turned on yet (this is normal) at the time when the delay time Td1 elapsed after the user start command signal has been outputted, the voltage at the terminal J2 is the battery voltage VB and the output of the voltage level conversion circuit 83 is the high level. The flip-flop 81 latches this high level and outputs the high level from its output Q1.

If the transistor T2 is already turned on (this is abnormal because of short-delay) at the time when the delay time Td1 elapsed after the user start command signal has been outputted, the voltage at the terminal J2 is 0V and the output of the voltage level conversion circuit 83 is the low level. The flip-flop 81 latches this low level and outputs the low level from its output Q1.

The flip-flop 82 latches the on/off state of the transistor T2 at the time of elapse of the delay time Td2 (>Tmax) of the delay circuit 85 after the user start command signal was outputted from the ECU 12.

If the transistor T2 is turned on already (this is normal) at the time when the delay time Td2 elapsed after the user start command signal has been outputted, the voltage at the terminal 32 is 0V and the output of the voltage level conversion circuit 83 is the low level. The flip-flop 82 latches this low level and outputs the low level from its output Q2.

If the transistor T2 is not turned on yet (this is abnormal because of long-delay) at the time when the delay time Td2 elapsed after the user start command signal has been outputted, the voltage at the terminal J2 is the battery voltage VB and the output of the voltage level conversion circuit 83 is the high level. The flip-flop 82 latches this high level and outputs the high level from its output Q2.

The flip-flops 81, 82 are configured to be reset when, for example, the vehicle is set to the ignition-off state. If the output Q1 of the flip-flop 81 is the high level and the output Q2 of the flip-flop 82 is the low level after the vehicle was turned to the ignition-on state and the user start was performed, the delay time Td of the delay circuit 47 is longer than Td1 and shorter than Td2. The delay time is determined to be in the normal range.

If the output Q1 of the flip-flop 81 is the low level after the user start was performed, the delay function is determined to have the short-delay abnormality. If the output Q2 of the flip-flop 82 is the high level after the user start was performed, the delay function is determined to have the long-delay abnormality In the third embodiment, therefore, the microcomputer 35 of the ECU 11 is configured to execute user start time abnormality detection processing shown in FIG. 10. The user start time abnormality detection processing is started when the microcomputer 35 is activated. In addition to this user start time abnormality detection processing, the microcomputer 35 also executes other processing in parallel relation by multitasking.

When the microcomputer 35 starts the user start time abnormality detection processing, it is checked first at S510 whether the user start was performed. Specifically, if it is determined by the complete combustion check processing based on the rotation signal that the engine 7 changed its state from the stop state to the complete combustion state (operation state), the engine complete combustion flag is changed from "0" to "1." At S510, therefore, it is determined that the user performed the user start operation, if the engine complete combustion flag is changed from "0" to "1" under a condition that the drive signal S2 for the transistor T2, which corresponds to the motor control signal for operating the motor 17, is the low level. It is assumed that the engine 7 is started when the transistors T1 and T2 are turned on by the user start command signal from the ECU 12.

If it is determined at S510 that the user start was performed, S520 is executed. At S520, the outputs Q1 and Q2 of the flip-flops 81 and 82 are taken in to check whether the outputs Q1 and Q2 are both low level. If the outputs Q1 and Q2 are both low, it is determined that the short-delay abnormality is present and S530 is executed. If the output Q1 of the flip-flop 81 is low, the output Q2 of the flip-flop 82 is assumed to be low as well. At S520, therefore, it is possible to check only whether the output Q1 of the flip-flop 81 is low.

At S530, the flag Fs is set to "1" to indicate the short-delay abnormality, thus finishing the user start time abnormality detection processing. If the check result at S520 is NO (that is, at least one of the outputs Q1 and Q2 is not low), S540 is executed to check whether both of the outputs Q1 and Q2 are high. If both of the outputs Q1 and Q2 are high, it is determined that the long-delay abnormality is present and S550 is executed. If the output Q2 of the flip-flop 82 is high, the output Q1 of the flip-flop 81 is assumed to be also high. Therefore, it is possible to only check at S540 whether the output Q2 of the flip-flop 82 is high.

At S550, the flag Fl is set to "1" to indicate the long-delay abnormality, thus finishing the user start time abnormality detection processing. If the check result at S540 is NO, that is, at least one of the outputs Q1 and Q2 is not high, it is assumed that the output Q1 is high and the output Q2 is low and hence no abnormality is present. Thus the user start time abnormality detection processing is finished.

Figure 10:
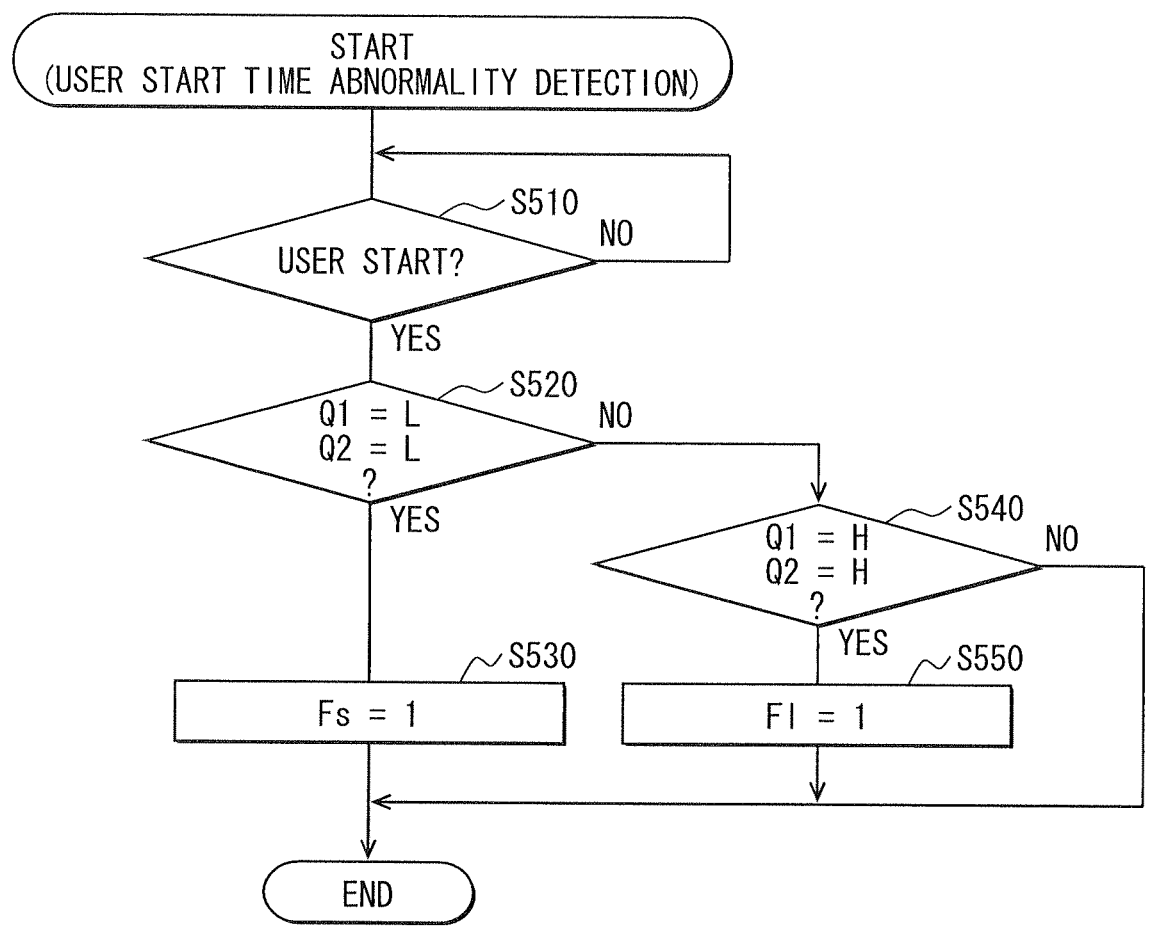
FIG. 10 is a flowchart showing user start time abnormality detection processing according to a third embodiment.

The microcomputer 35 in the ECU 11 executes the same warning processing as S320 of FIG. 6, when the flag Fl is set to "1" in the user start time abnormality detection processing of FIG. 10. The microcomputer 35 also executes the same warning processing as S320 of FIG. 6, when the flag Fs is set to "1" in the user start time abnormality detection processing of FIG. 10. The microcomputer 35 further executes the same processing (idle-stop prohibition processing, engine non-stop advice processing and user start prohibition processing) as S350, S360 and 5370 of FIG. 6. That is, the microcomputer 35 executes the fail-safe processing, which corresponds to the fail-safe processing of FIG. 6 without S340 and S380 to S420.

The third embodiment also provides the similar advantages as the second embodiment. If the microcomputer 35 of the ECU 11 needs comparatively long period to be activated after the battery voltage VB is supplied to the ECUs 11 and 12, the microcomputer 35 may not be activated yet when the user start command signal is outputted from the ECU 12 to the ECU 11 at the user start time. However, even in such a system configuration, the microcomputer 35 of the ECU 11 can detect the delay function abnormality at the user start time and execute different fail-safe processing in correspondence to types of abnormalities.

The abnormality detection apparatus for the starter control system is described with reference to its embodiments. The apparatus is however not limited to such embodiments and may be implemented in other modified embodiments.

For example, the ECU 11 and the ECU 12 may be integrated into one unit, which includes two microcomputers 15 and 35. In place of monitoring the voltage at the terminal 32 (drain voltage of the transistor T2), the output voltage of the relay 32 (voltage of the current supply path from the relay 32 to the coil 19a) may be monitored to detect the delay function abnormality.

The transistors T0 to T4 may be switching elements such as bipolar transistors or IGBTs or the like, which are other than FETs.

What is claimed is:

1. An abnormality detection apparatus for a starter control system of a vehicle, which includes a pinion control actuator, a motor control switch part, a first drive part and a second drive part,
   the pinion control actuator, when energized, moving a pinion gear of a starter for starting an engine of a vehicle from an initial position at which the pinion gear is disengaged with a ring gear of the engine to an engagement position at which the pinion gear is engaged with the ring gear,
   the motor control switch part provided in a current supply path to a motor of the starter which rotates the pinion gear, and operable to turn on independently of energization of the pinion control actuator and energize the motor by conducting the current supply path when turned on,
   the first drive part for performing a first drive operation, which energizes the pinion control actuator to move the pinion gear from the initial position to the engagement position at a start time of starting the engine,
   the second drive part for performing a second drive operation, which turns on the motor control switch part to energize the motor to start cranking of the engine after an elapse of a predetermined delay time from a start of the first operation of the first drive part, the abnormality detection apparatus comprising:
   a start time abnormality detection part for checking whether an actual delay time is a normal value, the actual delay time being an actual period from a start of the first drive operation by the first drive part to a start of the second drive operation by the second drive part at the time of starting the engine.

2. The abnormality detection apparatus according to claim 1, wherein:
   the start time abnormality check part checks whether at least the actual delay time is shorter than a minimum allowable value, which is a minimum value of a normal range of the delay time.

3. The abnormality detection apparatus according to claim 2, wherein:
   the start time abnormality check part prohibits an idle-stop control part from stopping the engine when the actual delay time is shorter than the minimum allowable value, the idle-stop control part being provided in the starter control system to automatically stop the engine when a predetermined automatic stop condition is satisfied and to automatically restart the engine thereafter when a predetermined automatic start condition is satisfied.

4. The abnormality detection apparatus according to claim 2, wherein:
   the start time abnormality check part outputs an advice to a driver of the vehicle not to stop the engine, when the actual delay time is shorter than the minimum allowable value.

5. The abnormality detection apparatus according to claim 2, wherein:
   the start time abnormality check part causes the pinion control actuator and the motor to be prohibited from being energized even if a driver of the vehicle performs a manual start operation for starting the engine, when the actual delay time is shorter than the minimum allowable value.

6. The abnormality detection apparatus according to claim 1, wherein:
the first drive part and the second drive part are inputted with a user start command signal, which is generated by a start operation performed by a driver of the vehicle for starting the engine;
the first drive part starts the first drive operation when the user start command signal is inputted;
the second drive part starts the second drive operation after the delay time from inputting of the user start command signal; and
the start time abnormality check part detects, as the actual delay time, an interval from when the user start command signal is inputted to the second drive part to when the second drive part starts the second drive operation.

7. The abnormality detection apparatus according to claim 6, further comprising:
a motor energization prohibition part for prohibiting energization of the motor irrespective of the second drive operation of the second drive part, when it is other than the start time for starting the engine; and
a non-start time abnormality check part for applying a dummy signal, which corresponds to the user start command signal, to the second drive part while the motor is prohibited from being energized by the motor energization prohibition part, and checking whether a dummy signal input delay time is a normal value of the actual delay time, the dummy signal input delay time being an actual delay time from when the dummy signal is inputted to the second drive part to when the second drive part starts the second drive operation.

8. The abnormality detection apparatus according to claim 7, wherein:
the non-start time abnormality check part checks whether at least the dummy signal input delay time is shorter than a minimum allowable value, which is a minimum value of a normal range of the delay time.

9. The abnormality detection apparatus according to claim 8, wherein:
the non-start time abnormality check part operates when the engine is in operation other than a start time of the engine; and
the non-start time abnormality check part prohibits an idle-stop control part from stopping the engine when the dummy signal input delay time is shorter than the minimum allowable value, the idle-stop control part being provided in the starter control system to automatically stop the engine when a predetermined automatic stop condition is satisfied and to automatically restart the engine thereafter when a predetermined automatic start condition is satisfied.

10. The abnormality detection apparatus according to claim 8, wherein:
the non-start time abnormality check part operates when the engine is in operation other than a start time of the engine; and
the non-start time abnormality check part outputs an advice to a driver of the vehicle not to stop the engine, when the dummy signal input delay time is shorter than the minimum allowable value.

11. The abnormality detection apparatus according to claim 8, wherein:
the non-start time abnormality check part operates when the engine is in operation other than a start time of the engine; and
the non-start time abnormality check part prohibits the pinion control actuator and the motor from being energized even if a driver of the vehicle performs a start operation for starting the engine, when the dummy signal input delay time is shorter than the minimum allowable value.

12. The abnormality detection apparatus according to claim 8, wherein:
the non-start time abnormality check part operates during an idle-stop state from when the engine is stopped by an idle-stop control part to when the engine is restarted by the idle-stop control part, the idle-stop control part automatically stopping the engine when a predetermined automatic stop condition is satisfied and automatically restarting thereafter the engine when a predetermined automatic start condition is satisfied;
the non-start time abnormality check part executes predetermined processing for starting the engine when the dummy signal input delay time is shorter than the minimum allowable value.

13. The abnormality detection apparatus according to claim 12, wherein:
the non-start time abnormality check part prohibits stopping of the engine when the engine is started by the predetermined processing for starting the engine.

14. The abnormality detection apparatus according to claim 12, wherein:
the non-start time abnormality check part outputs an advice to a driver of the vehicle not to stop the engine, when the engine is started by the predetermined processing for starting the engine.

15. The abnormality detection apparatus according to claim 12, wherein:
the non-start time abnormality check part prohibits the pinion control actuator and the motor from being energized even if a driver of the vehicle performs a start operation for starting the engine, when the engine is started by the predetermined processing.

16. The abnormality detection apparatus according to claim 12, further comprising:
a warning part for warning a driver of another vehicle to invite attention when the engine is not started by the predetermined processing for starting the engine.

17. The abnormality detection apparatus according to claim 16, wherein:
the warning part drives a hazard light to turn on and off as a warning to the driver of the another vehicle.

18. The abnormality detection apparatus according to claim 8, wherein:
the non-start time abnormality check part operates after the vehicle is set to an ignition-off state by an ignition-off operation of the driver of the vehicle; and
the non-start time abnormality check part prohibits the pinion control actuator and the motor from being energized even if a driver of the vehicle performs the start operation for starting the engine, when the dummy signal input delay time is shorter than the minimum allowable value.

19. The abnormality detection apparatus according to claim 8, wherein:
the non-start time abnormality check part operates from when the vehicle is set to an ignition-on state to when the user start command signal is generated; and the non-start time abnormality check part prohibits the pinion control actuator and the motor from being energized even if a driver of the vehicle performs the start operation for starting the engine, when the dummy signal input delay time is shorter than the minimum allowable value.

20. The abnormality detection apparatus according to claim 7, further comprising:
a warning part for warning the driver of the vehicle of presence of abnormality when the dummy signal input delay time is not normal.

21. The abnormality detection apparatus according to claim 1, further comprising:
a warning part for warning the driver of the vehicle of presence of abnormality when the actual delay time is not normal.

22. The abnormality detection apparatus according to claim 1, wherein:
the motor control switch part is a relay, which is turned on when a coil thereof is energized;
the starter control system includes a pinion drive relay and a motor drive relay, the pinion drive relay being provided in a current supply path to the pinion control actuator to energize the pinion control actuator through the current supply path when turned on, the motor drive relay being provided in a current supply path to a coil of the motor control switch part to energize the motor control switch part through the current supply path when turned on;
the first drive part includes a pinion drive transistor provided in the current supply path to the coil of the pinion drive relay for turning on the pinion drive relay through the current supply path when turned on; and
the second drive part includes a motor drive transistor provided in the current supply path to the coil of the motor drive relay for turning on the motor drive relay through the current supply path when turned on.

23. An abnormality detection apparatus for a starter control system of a vehicle, which includes a pinion control actuator, a motor control switch, a first drive switch, a delay circuit and a second drive switch,
the pinion control actuator, when energized, moving a pinion gear of a starter for starting an engine of a vehicle from an initial position at which the pinion gear is disengaged from a ring gear of the engine to an engagement position at which the pinion gear is engaged with the ring gear,
the motor control switch part provided in a current supply path to a motor of the starter, which rotates the pinion gear, and operable to turn on independently of energization of the pinion control actuator and energize the motor by conducting the current supply path when turned on,
the first drive switch for performing a first drive operation, which energizes the pinion control actuator to move the pinion gear from the initial position to the engagement position upon receiving a first start command for starting the engine,
the delay circuit receiving the first start command and outputting a second drive command after an elapse of a predetermined delay time from receiving of the first start command,
the second drive switch for performing a second drive operation, which turns on the motor control switch to energize the motor to start cranking of the engine upon receiving of the second drive command from the delay circuit, the abnormality detection apparatus comprising:
a microcomputer for determining an abnormality of the delay circuit when an actual delay time is different from the predetermined delay time by a predetermined value, the actual delay time being an actual interval from the receiving of the first start command to a start of the second drive operation of the second drive switch.

* * * * *